(12) United States Patent
Ding et al.

(10) Patent No.: US 11,346,941 B2
(45) Date of Patent: May 31, 2022

(54) SHAPED ULTRASONIC TRANSMISSION AND ECHO PROCESSING WITH CODING

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US); Anand Gopalan, Plano, TX (US); Michael John Zroka, Marengo, IL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 73 days.

(21) Appl. No.: 16/364,613

(22) Filed: Mar. 26, 2019

(65) Prior Publication Data

US 2020/0309945 A1    Oct. 1, 2020

(51) Int. Cl.
*G01S 15/00*  (2020.01)
*G01S 15/10*  (2006.01)
*G01S 7/524*  (2006.01)

(52) U.S. Cl.
CPC ............ *G01S 15/104* (2013.01); *G01S 7/524* (2013.01)

(58) Field of Classification Search
CPC ...... G01S 15/104; G01S 7/524; G01S 15/325; G01S 15/582; G01S 15/87; G01S 15/931; G01S 2015/938; G01S 7/527; G01S 15/102; G01S 3/808; G01S 15/10; G01S 15/8979; G01S 15/8988; G01S 15/8993; G01S 7/52004; G01S 7/52034; G01S 7/52036; G01S 7/52074; G01S 7/5273; G01S 7/539

USPC ........................................................... 367/93
See application file for complete search history.

(56) References Cited

U.S. PATENT DOCUMENTS

| | | | | |
|---|---|---|---|---|
| 5,105,818 A | * | 4/1992 | Christian | ................. A61B 8/06 600/463 |
| 5,684,490 A | * | 11/1997 | Young | ..................... G01S 13/44 342/70 |
| 6,191,537 B1 | * | 2/2001 | Celso | .................... H05B 41/042 315/219 |
| 6,307,622 B1 | * | 10/2001 | Lewis | ..................... G01S 17/08 356/4.01 |
| 6,427,157 B1 | * | 7/2002 | Webb | ................. H03H 17/0275 341/61 |
| 9,645,228 B1 | * | 5/2017 | Doerry | .................... G01S 7/282 |

(Continued)

*Primary Examiner* — Naomi J Small
(74) *Attorney, Agent, or Firm* — Michael A. Davis, Jr.; Charles A. Brill; Frank D. Cimino

(57) ABSTRACT

Ultrasonic sensing systems and associated methods provide side-lobe reduction to improve the acoustic detection of small objects, the signature envelope peaks of which can otherwise be obscured by subsidiary envelope peaks in side lobes that result from residual correlation between a signal received by an ultrasonic transducer and a template signal corresponding to a burst signal emitted by the ultrasonic transducer. A shaping signal by which the amplitude of the burst signal can be varied with respect to time is taken into account in the template signal, and correlator circuitry correlates a signal derived from the ultrasonic transducer with the template signal to produce a correlated output exhibiting the desired side-lobe reduction. The distance from the transducer to the detected object can thereby be determined with enhanced accuracy and responsiveness.

21 Claims, 18 Drawing Sheets

(56) References Cited

U.S. PATENT DOCUMENTS

| | | | | |
|---|---|---|---|---|
| 2004/0114381 | A1* | 6/2004 | Salmeen | B60Q 1/085 362/465 |
| 2004/0136438 | A1* | 7/2004 | Fullerton | H03C 1/02 375/130 |
| 2010/0262009 | A1* | 10/2010 | Lynch | G01S 7/52036 600/455 |
| 2012/0095726 | A1* | 4/2012 | Burcea | G01S 7/285 702/159 |
| 2012/0272738 | A1* | 11/2012 | Klessel | A61B 8/4483 73/602 |
| 2013/0123577 | A1* | 5/2013 | Ho | A61B 8/4209 600/109 |
| 2013/0176161 | A1* | 7/2013 | Derham | G01S 7/36 342/27 |
| 2016/0003946 | A1* | 1/2016 | Gilliland | G01S 17/10 356/5.01 |
| 2016/0014426 | A1* | 1/2016 | Richert | G06T 7/593 375/240.16 |
| 2016/0331469 | A1* | 11/2016 | Hall | A61B 8/4218 |
| 2017/0083164 | A1* | 3/2017 | Sheng | G06F 3/03545 |
| 2017/0367578 | A1* | 12/2017 | Melodia | A61B 5/0026 |
| 2018/0321380 | A1* | 11/2018 | Barker | G01S 7/52015 |
| 2019/0033436 | A1* | 1/2019 | Spiegel | G01S 7/003 |

* cited by examiner

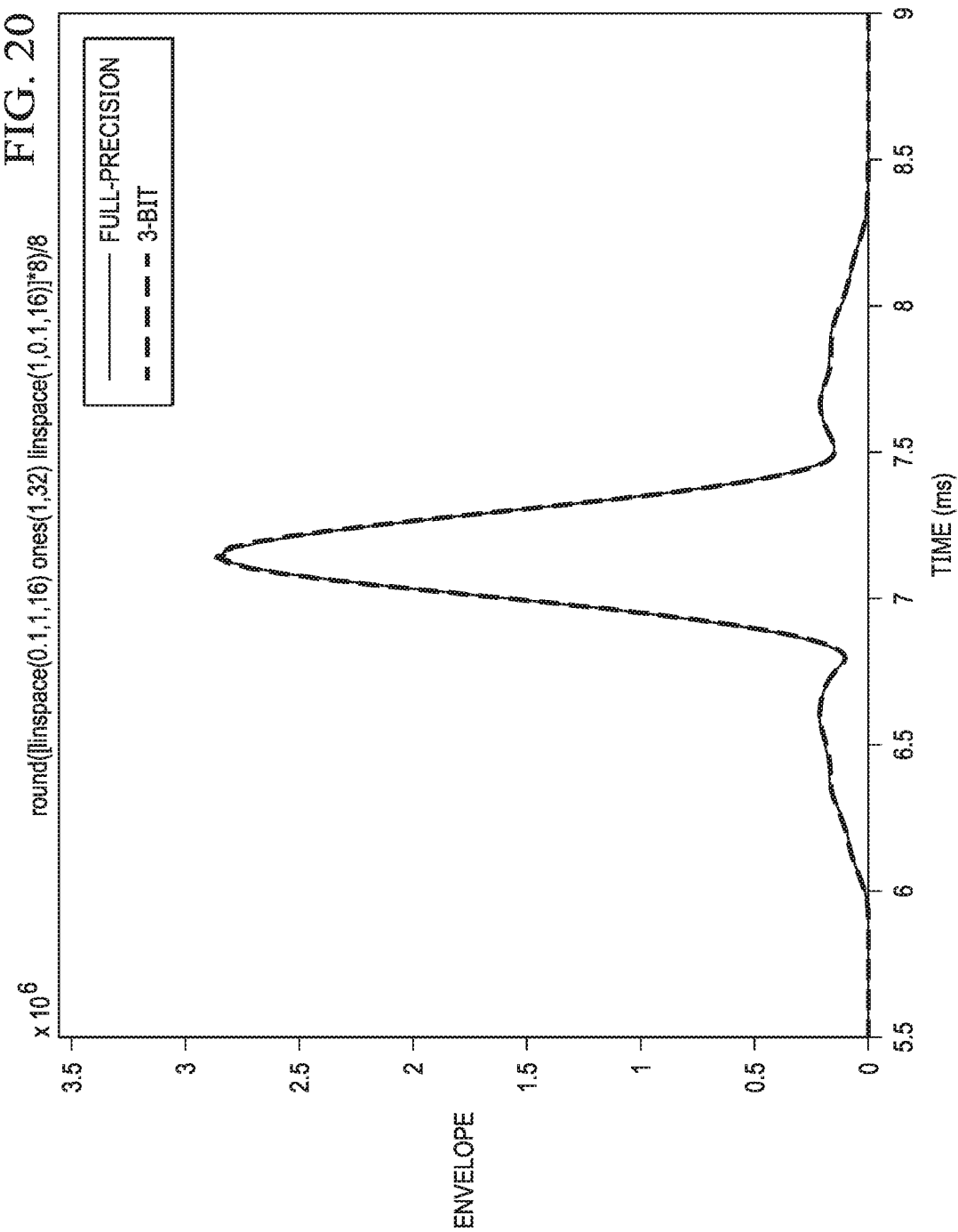

SHAPED ULTRASONIC TRANSMISSION AND ECHO PROCESSING WITH CODING

TECHNICAL FIELD

This disclosure relates to electronic processing systems and methods, particularly for shaped ultrasonic transmission and echo processing with coding.

BACKGROUND

Ultrasonic ranging is used in a variety of applications. For example, in an automotive application, ultrasonic transducers can be arranged in a bumper or fender of an automobile. The transducers emit ultrasonic signals that reflect off nearby objects, if present, and sense the reflections. The round-trip time of the ultrasound signals is measured so that distance to the object can be determined or, by processing reflection information from multiple transducers, the position of the object can be deduced. Collision avoidance can thereby be achieved, e.g., by presenting such determined or deduced information, or navigation information based thereon, to a warning system configured to present a warning signal to a human driver, or to an automated driving system configured to navigate a vehicle to avoid collisions with detected obstacles.

SUMMARY

An example ultrasonic sensing system includes burst generation circuitry to generate a frequency-modulation-coded burst signal comprising a sequence of pulses of variable time duration, shaping control circuitry to generate a shaping signal by which the amplitude of the burst signal can be varied with respect to time, and resample circuitry to generate a template signal based on the burst signal and the shaping signal. The system further includes correlator circuitry to correlate a signal derived from an ultrasonic transducer with the template signal to produce a correlated output.

In another example, a method of ultrasonic detection includes generating a frequency-modulation-coded burst signal comprising a sequence of pulses of variable time duration, and generating a shaping signal by which the amplitude of the burst signal can be varied with respect to time. A template signal based is then generated on the burst signal and the shaping signal. An ultrasonic acoustic signal is emitted based at least on the burst signal, and a reflection of the acoustic signal is detected with an ultrasonic transducer. A signal derived from the ultrasonic transducer is correlated with the template signal to produce a correlated output, and a time-of-flight of the acoustic signal and its reflection is then determined based on the correlated output.

In yet another example, ultrasonic sensing circuitry includes a memory configured to store a signal received and sampled from the output of an ultrasonic transducer, and an FIR filter. The received signal contains an echo of a burst signal emitted by the transducer. The burst signal is based on a frequency modulation coding signal and an amplitude shaping signal. The FIR filter is configured to multiply samples of the received signal with a template signal to generate products and to sum the products to provide a correlated signal that correlates the received signal with the template signal, wherein the template signal is based on the frequency modulation coding signal and the amplitude shaping signal. The circuitry can further include resample circuitry to provide the template signal as a specified number of samples.

BRIEF DESCRIPTION OF THE DRAWINGS

FIG. 20 is a graph of two example autocorrelated envelopes corresponding to the burst shaping windows of FIG. 14.

DETAILED DESCRIPTION

Reflected ultrasonic signals can be detected by an ultrasonic transducer and used to measure round-trip time to thereby determine distance to an object that reflects the ultrasonic signals. For example, automotive applications can use one or more ultrasonic sensors to sense the distances of objects behind, along, or in front of a car. This application discloses systems and methods that provide enhanced ultrasonic detection of obstacles, particularly when multiple ultrasonic transducers operate concurrently. Discrimination of echoes of ultrasonic signals produced by different transducers is improved by shaping emitted signal bursts and processing received echoes with knowledge of such shaping information. Allowing concurrent operation of multiple transducers greatly improves the speed of the detection system and thereby also the responsiveness of the associated driver-warning or automated driving control system. The shaping of the signal bursts improves reflection detection by further distinguishing the main peak in envelopes of correlated reflected signals, which main peaks correspond to true reflections, from subsidiary peaks in side lobes of the envelopes, which do not correspond to true reflections.

Figure 1:
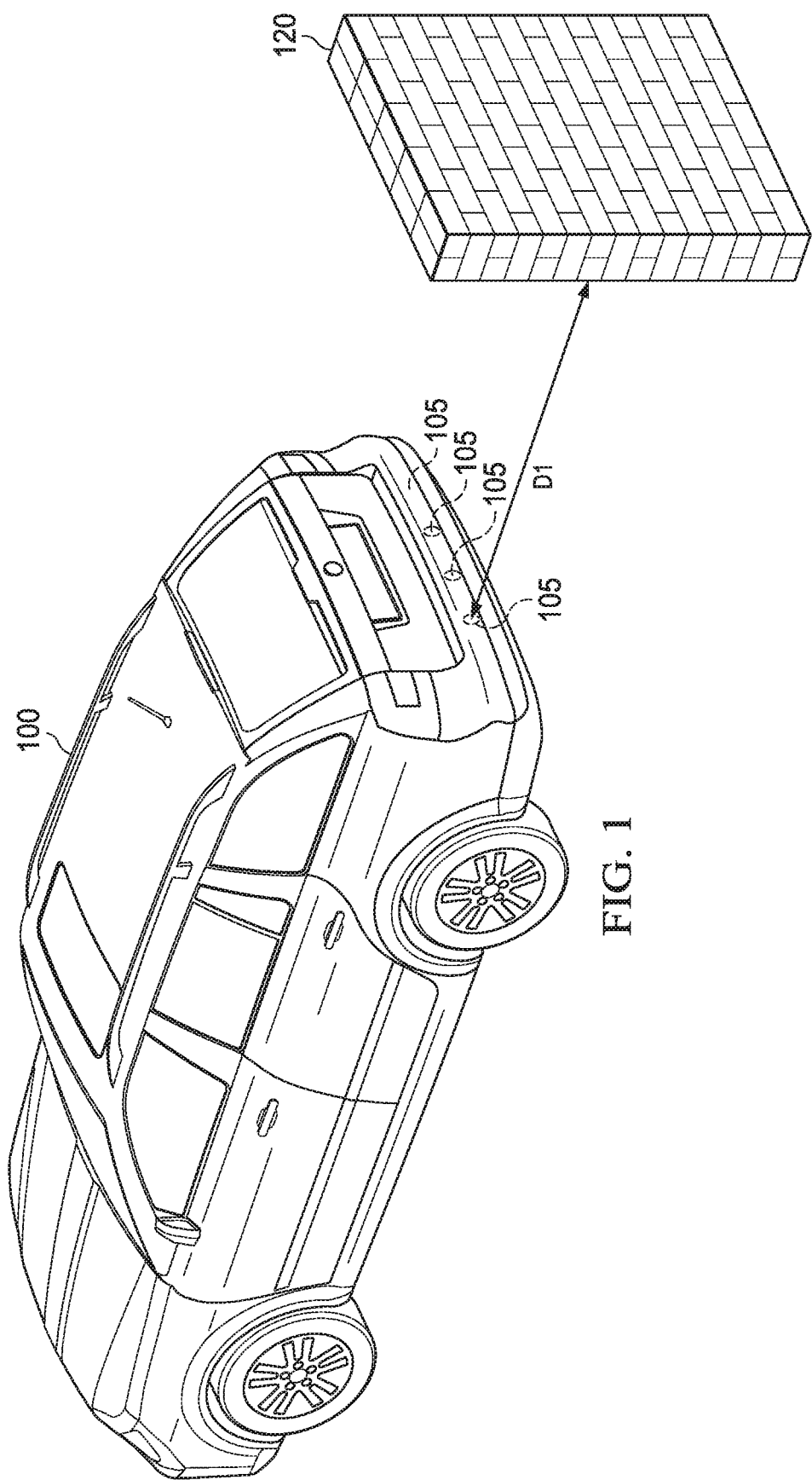
FIG. 1 illustrates an automobile with ultrasonic transducers to measure distance to an object.

FIG. 1 illustrates the use of a distance measuring (i.e., ranging) system based on ultrasound, namely, in an automobile 100 that includes one or more ultrasonic transducers 105 in the front and/or rear bumpers. In the example of FIG. 1, four ultrasonic transducers 105 are shown, but the number of transducers in each bumper can be other than four in other examples. As used herein, "transducers" refers to ultrasonic transducers. Any single transducer can function both to emit ultrasonic signals, by transducing electrical signals into acoustical signals, and to sense reflected signals, by transducing acoustical signals into electric signals. Each transducer 105 can, for example, emit sound waves and then can detect a reflection of the emitted sound waves after they have bounced off an object (e.g., object 120) and returned to the transducer. The elapsed time t between when a sound is first emitted from the transducer and when a resultant reflected sound wave is detected back at the transducer can be measured by receiver circuitry coupled to the transducer. The total round-trip distance can be calculated as the product of the speed of sound through air c (about 344 meters per second, i.e. 1,129 feet per second) and the measured time t. The distance D1 between the transducer and an object is then given by the formula D1=ct/2, where the division by two accounts for the fact that the reflected sound waves make a round trip back to the transducer.

In some examples, the sound wave signals are emitted as short bursts of sound at a specific frequency, typically above 20 kHz, e.g., at about 50 kHz. The emitted sound waves typically comprise a number of pulses, e.g., between about fifteen and one hundred pulses, e.g., between about twenty and sixty-five pulses. A controller (not shown in FIG. 1), which can, for example, be implemented as an integrated circuit (IC) associated with and packaged with a single transducer 105, can drive the transducer 105 with an electrical driving signal. The transducer 105 can then convert the electrical driving signal into an acoustic sound wave going out of the transducer. A controller directing its associated transducer to emit a burst will herein be referred to as "bursting" the transducer. The transducer 105 transduces a received reflected sound wave into an electrical signal and passes the transduced electrical received signal to a receiver in the controller that is configured to process the received signal. Internal to the controller is a timer that is started upon emission of the burst sequence, and, upon receipt of a valid echo, the value of the timer is recorded as the time-of-flight (ToF) of the echo. As noted above, this time-of-flight, divided by two and multiplied by the speed of sound in air, gives the distance between the transducer 105 and the reflecting object 120.

In some implementations, the transducers 105 all emit the same frequency (e.g., 50 kHz) but do so in sequential fashion, that is, one transducer 105 emits a sound signal and waits for a predetermined period of time for a reflection before the next transducer 105 is permitted to emit its sound signal. Without waiting, it can be ambiguous which transducer emitted the signal echoed, which in turn can diminish the accuracy of the determination of the position or distance of the reflecting object. Such waiting means that for an example maximum object detection range of five meters, about thirty milliseconds must elapse between sequential bursts of different transducers, which means that a single scan of a typical complement of four sensors takes one hundred twenty milliseconds. This length of time may be unacceptably long in time-critical applications such as those involving collision detection and warning.

By contrast to the single-tone implementations described above, the systems and methods described herein use coded-waveform burst signals to distinguish between the burst signals of different transducers and thereby to reduce or eliminate the time needed between bursting of different transducers. Rather than using a single-tone burst signal, a frequency-modulated signal can be emitted by any one transducer, permitting disambiguation of return echoes resulting from multiple transducers. Other types of modulation, such as phase modulation, can also be used to generate a coded signal.

In examples that use such frequency-modulation coding, each burst can consist, for example, of a pulse sequence resembling a square wave, but with each pulse in the waveform having a different duration corresponding to a different frequency. In some examples, the frequencies used to generate a given sound burst may range between a first frequency and second frequency and thus have a difference referred to as Δf. As an example, a first pulse in a burst can have a duration corresponding to a frequency of 48.0 kHz, a second pulse in the burst can have a duration corresponding to a frequency of 48.2 kHz, a third pulse in the burst can have a duration corresponding to a frequency of 48.4 kHz, and so on, until the twenty-first and last pulse in the burst, which can have a duration corresponding to a frequency of 52.0 kHz. The preceding represents but one example; other pulse frequencies and number of pulses per burst are also possible, as are arrangements of different-frequency pulses within the burst, beyond sequential frequency increase, as in this example, or, in other examples, frequency decrease, or frequency increase-then-decrease, or frequency decrease-then-increase.

Thus, in other examples, a burst can sweep up from a first frequency to a second, higher frequency and back down again to the first frequency or to a third frequency that is lower than the second frequency. In still other examples, the burst can sweep down from a first frequency to a second, lower frequency and then back up to the first frequency or to a third frequency that is higher than the second frequency. Other modulation patterns are possible as well. Whatever the pattern, the particular sweep characteristics of the burst, in terms of pulse frequencies, number of pulses, time duration of pulses, and/or time-arrangement of pulses (e.g., by frequency, duration or otherwise) can act as a burst signature that is identifying of the transducer emitting the burst. Each transducer can have its own unique frequency modulation signature in the coded burst waveform it emits. Thanks at least in part to the above-described burst coding, no restriction need be placed on the overlapping of the frequency ranges of the sweep(s) in bursts from different transducers.

Figure 2:
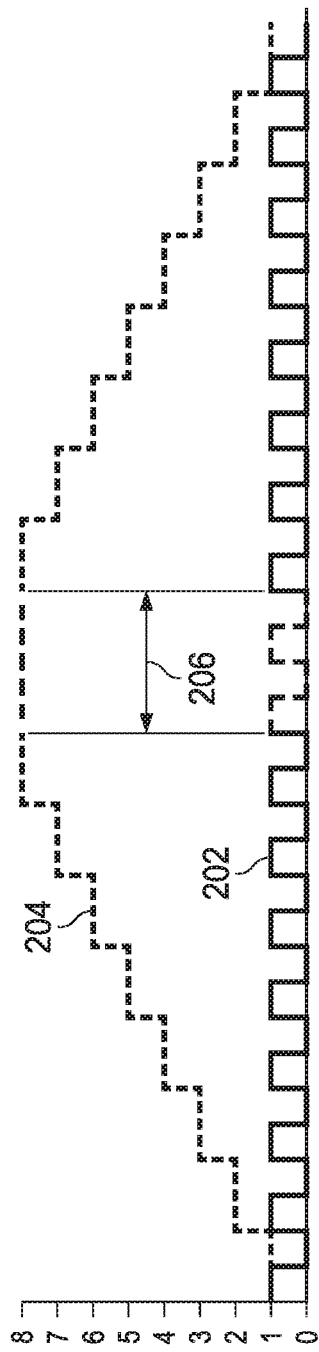
FIGS. 2-4 are digital waveforms illustrating example ultrasonic-transducer emitted-signal burst amplitude shaping.
Figure 3:
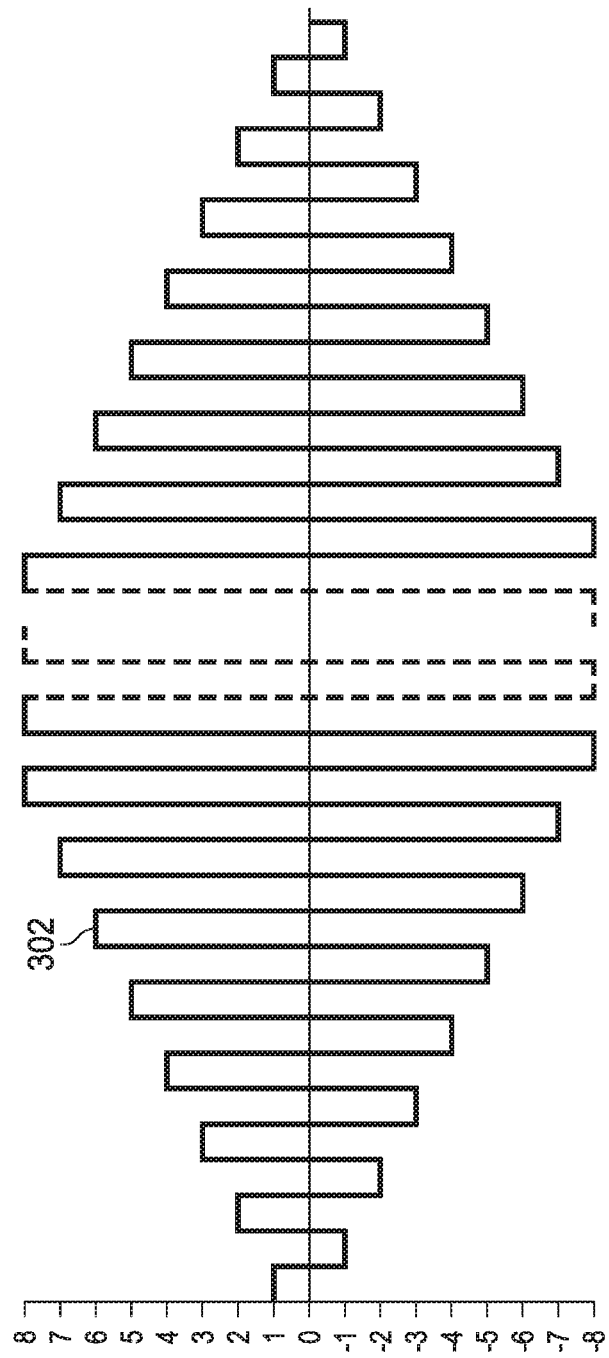
Figure 4:
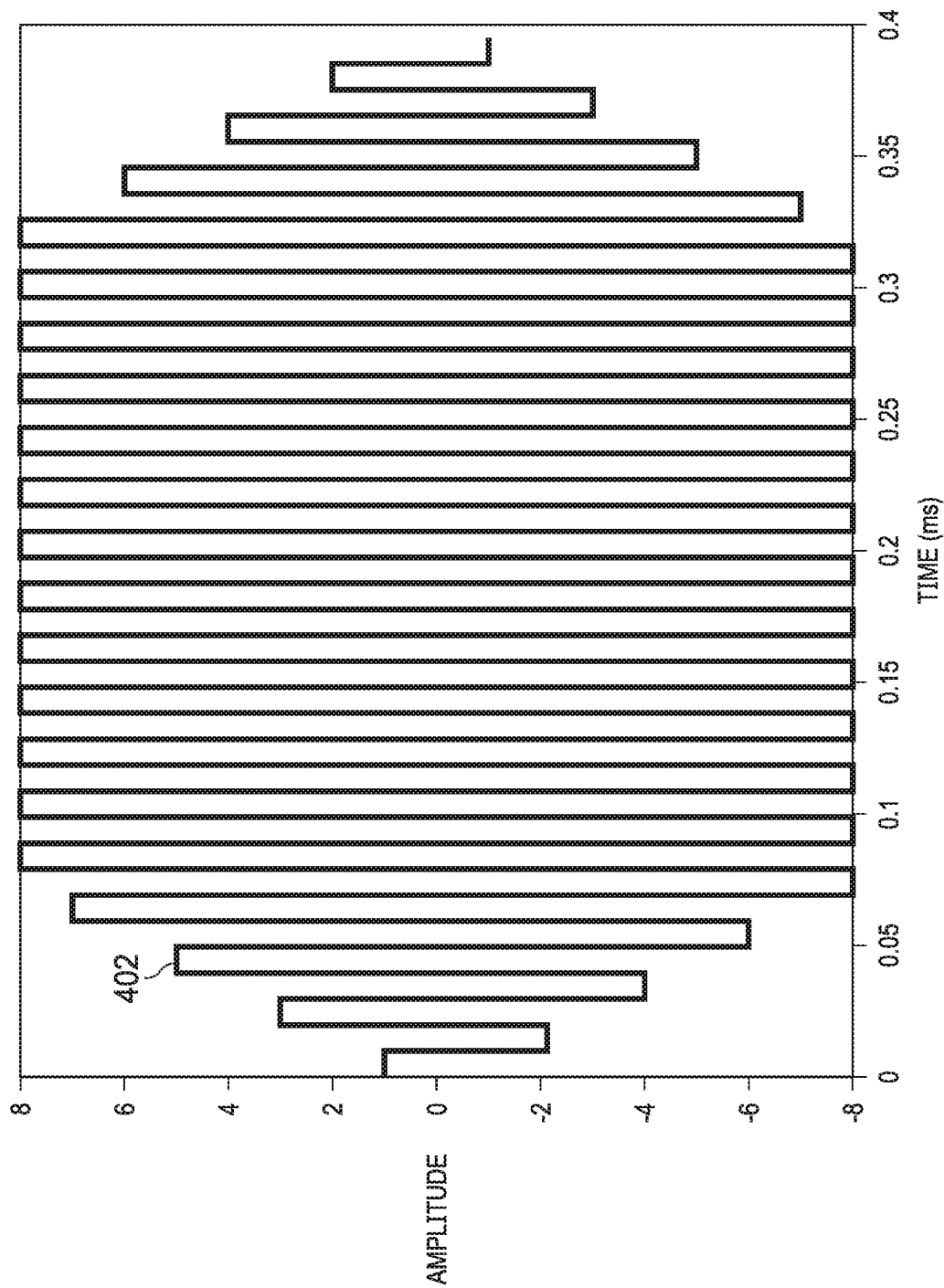

FIGS. 2, 3, and 4 illustrate example burst amplitude shaping. Square wave template pattern 202, shown in FIG. 2, is combined with window pattern 204 of ascending-then-descending amplitude, also shown in FIG. 2, to create windowed template pattern 302 in FIG. 3. Window pattern 204 can have a constant value over a constant window region 206, which can be of arbitrary length, as indicated by dashed lines in the plots 202, 204, 302. The amplitude change of the windowed template pattern 302 in the illustrated example is aligned with a complete square wave period. In other words, the amplitude is only allowed to ramp to a next level after a complete cycle of template pattern 202. Amplitude changes can also be aligned with half-period waveform changes, as shown in the example windowed template pattern 402 of FIG. 4.

As described in greater detail below, receiver circuitry in the controller associated with a particular transducer can be equipped with a correlator. The correlator can be provided with a template that is sampled from a coded signal used to create the driving signal. Each transducer thereby correlates only to its own template. Specifically, because each transducer has a distinct frequency modulation pattern, each transducer's receiver circuitry is able to correlate a received signal to only that transducer's own frequency modulation signature. Owing to the distinctness of the different transducers' bursts, the bursts can temporally overlap, e.g., all of the transducers 105 can emit their sound signals concurrently or simultaneously. As each emitted sound signal is uniquely coded for a specific transducer 105, the reflected sounds signals can be unique as well, and thus can be differentiated by the receiver circuitry connected to each transducer.

Figure 5:
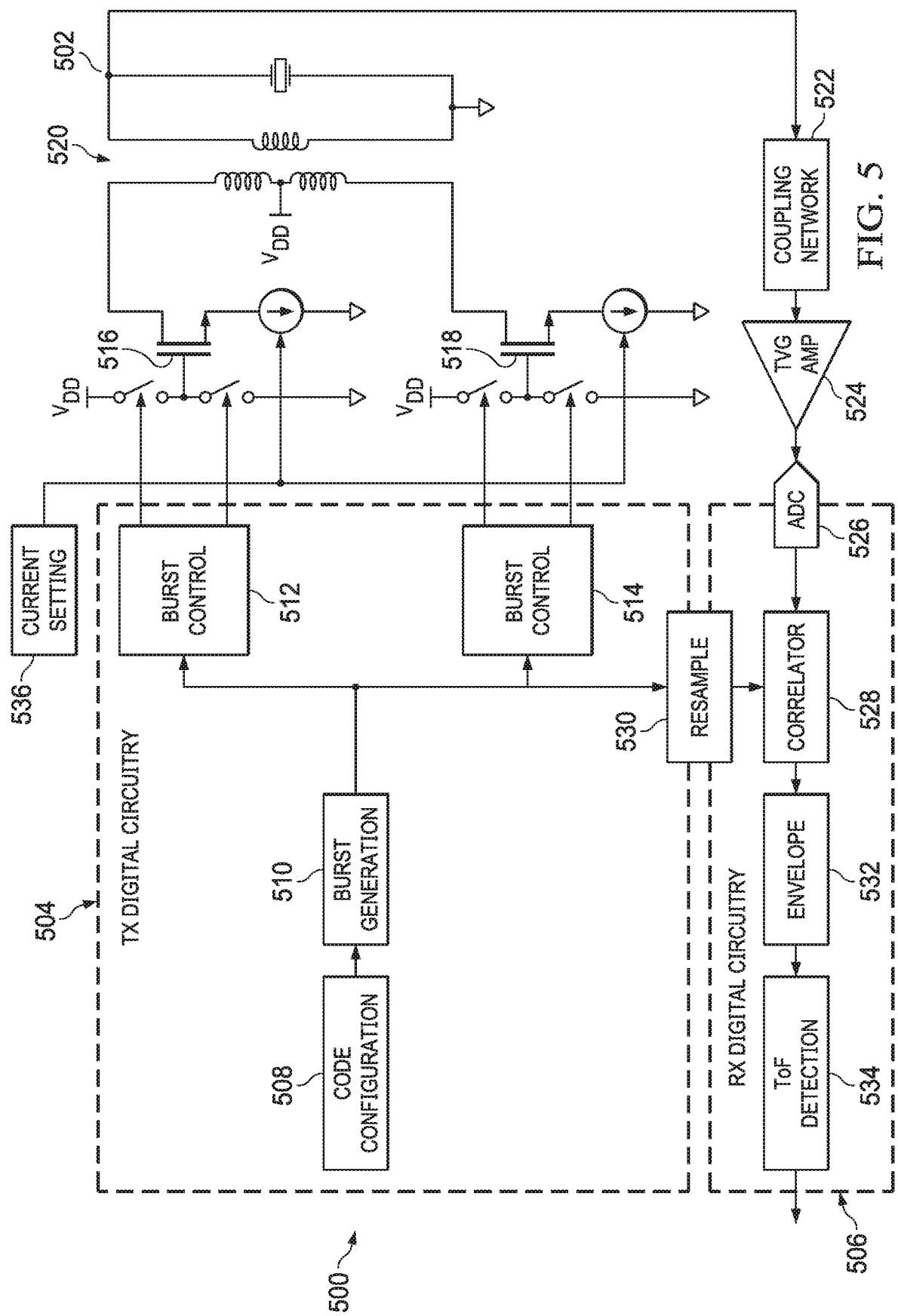
FIG. 5 is a block diagram of an example portion of a controller and an associated transducer.

FIG. 5 schematically illustrates an example portion 500 of a controller and its associated transducer 502 implementing the above-described frequency-modulation coding, without implementing burst amplitude shaping. The controller includes transmitter (TX) digital circuitry 504, configured to provide a frequency-modulation coded burst pattern to transducer 502, and receiver (RX) digital circuitry 506, configured to receive electrical signals corresponding to echoes transduced by transducer 502 and to process the received signals to determine a corresponding time of flight (ToF).

Transmitter digital circuitry 504 includes coding configuration circuitry 508 configured to determine the signature of the code in the burst signal to be generated, i.e., whether the code should be going up in frequency, going down in frequency, going up and then down, going down and then up, or some other configuration. In some examples, this burst signature determination can be made pursuant to a parameter or parameters programmable by a user, such as a systems integrator placing the controller into service in an application such as an automobile. In other examples, this burst signature determination can be made pursuant to a signal or signals received from another component, such as an electronic control unit (ECU) (not shown in FIG. 5), that can be connected to the controller and to controllers associated with other transducers, and which can be configured to coordinate the functioning of the multiple controller/transducer pairs.

Transmitter digital circuitry 504 further includes burst generation circuitry 510 configured to receive the code signature from the coding configuration circuitry 508 and to generate a signal comprising a number of pulses having the prescribed frequency modulation pattern. This signal is passed to burst control circuitry 512, 514, which is configured to control the bursting of the transducer 502. In the illustrated example, this is done by using the signal to drive two switches (e.g., CMOS switches) connected to the gate of a field effect transistor (FET) 516 and, contemporaneously, two corresponding switches connected to the gate of FET 518. The control of these switches drives a transformer 520, which is used to boost a switching signal ranging from, for example, ground to $V_{DD}$ (e.g., tens of volts), to, e.g., minus one hundred volts to plus one hundred volts. In the illustrated configuration, the sources of FETs 516, 518 are each tied to a respective current source connected, on the other end, to a low-voltage node (e.g., ground) while the drains of FETs 516, 518 are connected to opposite ends of the primary winding of transformer 520.

Transducer 502 can be, for example, a closed-top transducer, wherein the top of the transducer is completely sealed by a metal casing so that it is not affected by weather conditions, and consequently, such transducer 502 may need a large driving voltage in order to generate an output sound wave of amplitude adequate to generate a detectable reflection in the distance range of interest (e.g., within between zero and ten meters, e.g., within between zero meters and about five meters). Transformer 520 can thus be used to boost the driving voltage of transducer 502.

Transducer 502 is also connected to receiver circuitry in the controller. After the bursting, the two switches associated with each FET 516, 518 are opened, and resultantly, transducer 502 is uncoupled from the transmission side, since transducer 502 then only "sees" the secondary winding of transformer 520, and is coupled solely to the receiver side. On the receiver side, any echo detected by transducer 502 is converted from acoustic energy into electrical energy and then sensed by the receiver. In the illustrated example, the transduced signal is provided first to a coupling network 522 and a time-varying gain (TVG) receiver amplifier 524, before being sampled by an analog-to-digital converter (ADC) 526 to prepare it for digital processing by receiver digital circuitry 506. Coupling network 522 can be used to couple the AC electrical signal to the receiver amplifier 524 while protecting the input of the receiver amplifier 524 from the high voltage swings during burst period.

Figure 6:
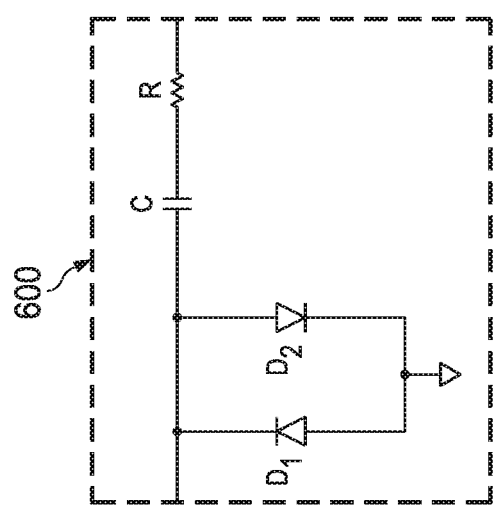
FIG. 6 is a schematic diagram of an example coupling network.

FIG. 6 shows an example coupling network 600 that can correspond to coupling network 522 in FIG. 5. In the example of FIG. 6, coupling network 600 consists of a resistor R, a capacitor C, and two diodes $D_1$ and $D_2$. The input from an ultrasonic transducer can be provided to the resistor R at the node on the right, and the output to a receiver amplifier can be provided from the node on the left to which the capacitor C and the two diodes $D_1$, $D_2$ are connected. The two diodes $D_1$, $D_2$ can be used to limit voltage signals going into the receive amplifier. The capacitor C and resistor R can be used to couple AC signals (i.e., to block DC components) while limiting the amount of current going through the diodes during transmission bursting, which can create hundreds of volts of swing voltage at the right end of the resistor R. As one example, the value of resistor R can be about 100 ohms and the value of capacitor C can be about 390 picofarads, while the diodes can be configured to clip signals above 0.7 volts and below −0.7 volts.

Returning to FIG. 5, the sampled signal is provided to correlator circuitry 528. Correlator circuitry 528 also has an input from resample circuitry 530, which is configured to resample the burst signal generated by the transmitter digital circuitry 504 (i.e., from the burst generation circuitry 510) and thereby to provide a TX template of the burst signal to correlator circuitry 528. Resample circuitry 530 can, for example, provide the template signal as a specified number of samples. The burst signal generated by the transmitter digital circuitry 504 may be a higher sampling rate, e.g., 16 megahertz, to allow fine adjustment of the center frequency of the burst signal. The sampled received signal can thus be of a lower sampling rate, e.g., 400 kilohertz. Thus, for example, the resample circuitry 530 can decimate the high-rate burst signal into a low-rate template signal for the correlator circuitry 528 by only taking one sample from the burst signal for every 16,000,000/400,000=40 TX samples. The template generation continues until the end of the burst signal. Correlator circuitry 528 is configured to perform correlation between the two provided inputs, i.e., between the sampled received signal given to it by ADC 526 and the TX template of the original burst signal given to it by resample circuitry 530. Correlator circuitry 528 may also provide some gain to the ADC output that can depend on the length of the TX template provided by resample circuitry 530.

The resultant correlated output of correlator circuitry 528, which ensures that the processed received signal corresponds to the burst signal produced by transducer 502 and not, for example, to a different burst signal produced by another transducer (not shown) in an array of such transducers, is provided to envelope circuitry 532 that determines the envelope of the correlated output. Based on this envelope, e.g., by measuring a time associated with a main peak found in the envelope, time-of-flight detection circuitry 534 determines the time-of-flight of the received (and now correlated) signal.

Figure 7:
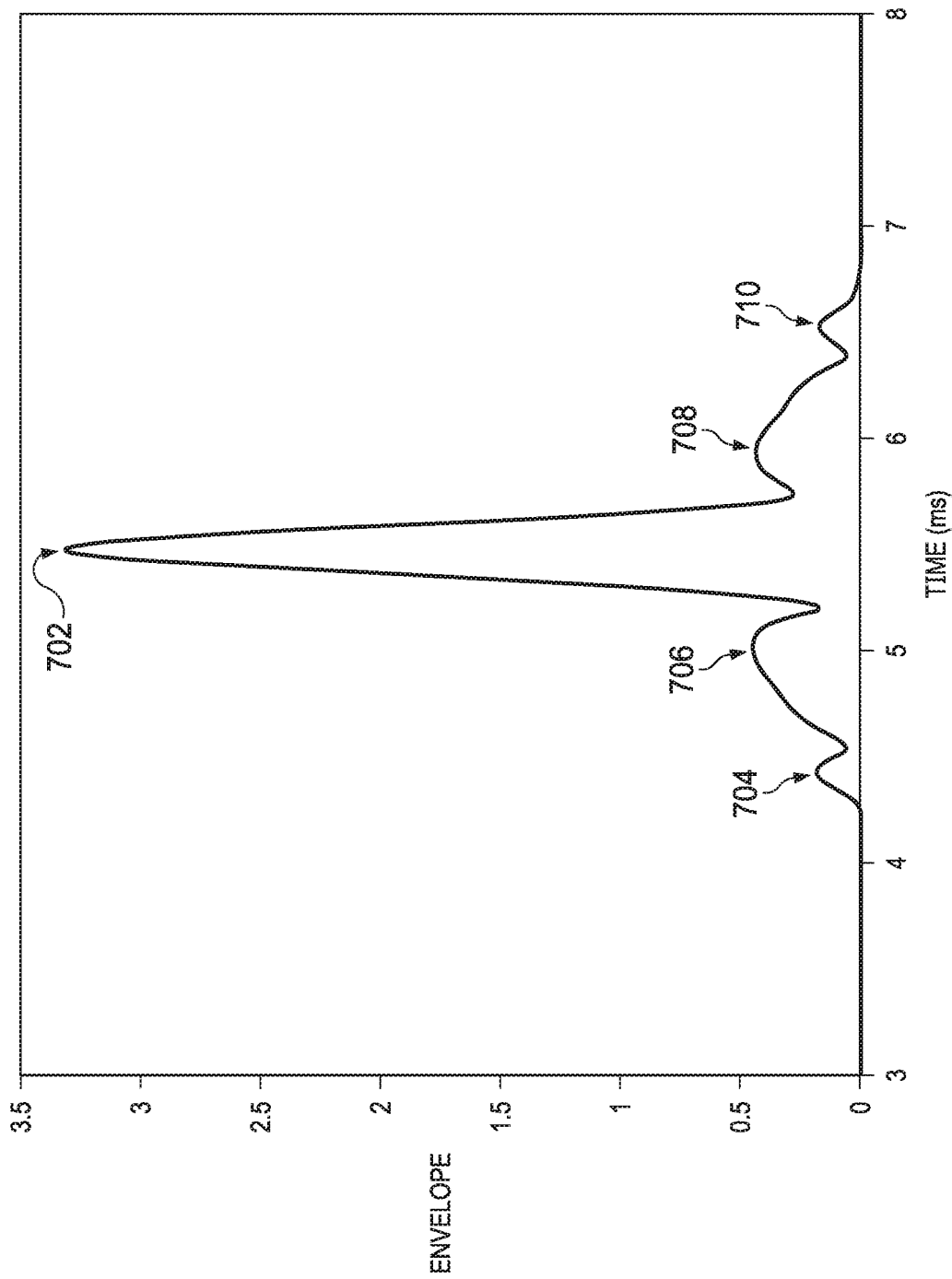
FIG. 7 is a graph of an example envelope of a sensed ultrasonic reflection.

FIG. 7 shows an example output of the envelope circuitry 532 following correlation by correlator circuitry 528. The envelope consists of a time series of only positive or zeroed values plotted on a normalized scale of digital units. Main peak 702 shows a likely best match between received data (i.e., the sampled signal is provided to correlator circuitry 528) and the TX template (provided by resample circuitry 530). Subsidiary peaks 704, 706, 708, 710, which make up what are termed "side lobes," are indicative of residual correlation from imperfect alignment between the received data and the TX template. The correlation performed by correlator circuitry 528 in effect slides the TX template and the received data with respect to each other, so when they are perfectly aligned (or nearly so to within some tolerance), the result is prominent main peak 702, and when they are imperfectly aligned, residual correlation between the TX template and the received data waveforms causes the side lobes consisting of subsidiary peaks 704, 706, 708, 710 shown in FIG. 7.

Returning again to FIG. 5, current setting circuitry 536, associated solely with the transmitter digital circuitry 504 in the example 500 of FIG. 5, provides a signal to set the voltage level provided to FETs 516, 518 via their respective source-node-connected current sources, each of which respectively controls the current level going through the corresponding FET. Current setting circuitry 536 can thereby control the amplitude of a burst signal. The particular current setting used by current setting circuitry 536 can be provided as a parameter that is programmable by a user, such as a systems integrator, or can be provided by an overall controller like an ECU, but however the current setting is provided, in example 500 shown in FIG. 5, the current setting is fixed for the duration of the burst and does not, for example, depend on the coding waveform generated by code configuration circuitry 508, or otherwise vary according to burst timing. Accordingly, in an example burst made up of twenty pulses, every single such pulse has the same current setting, and therefore the same or approximately the same amplitude as all other pulses in the burst when provided to transducer 502.

With reference to FIG. 7, because a smaller object attempting to be detected by the system may result in a smaller main peak 702, side lobes in correlator outputs can mask small objects. It is therefore desirable to suppress side lobes in correlator outputs. The example 800 shown in FIG. 8 can achieve such suppression through the shaping of the TX bursting waveform and the RX correlator template to achieve a shaped coding waveform, which reduces side lobes with a small reduction of correlation peaks. In particular, the example 500 of FIG. 5 can be modified to achieve TX burst shaping through current control, and RX template shaping by modifying the coding template delivered to correlator circuitry 528.

Figure 8:
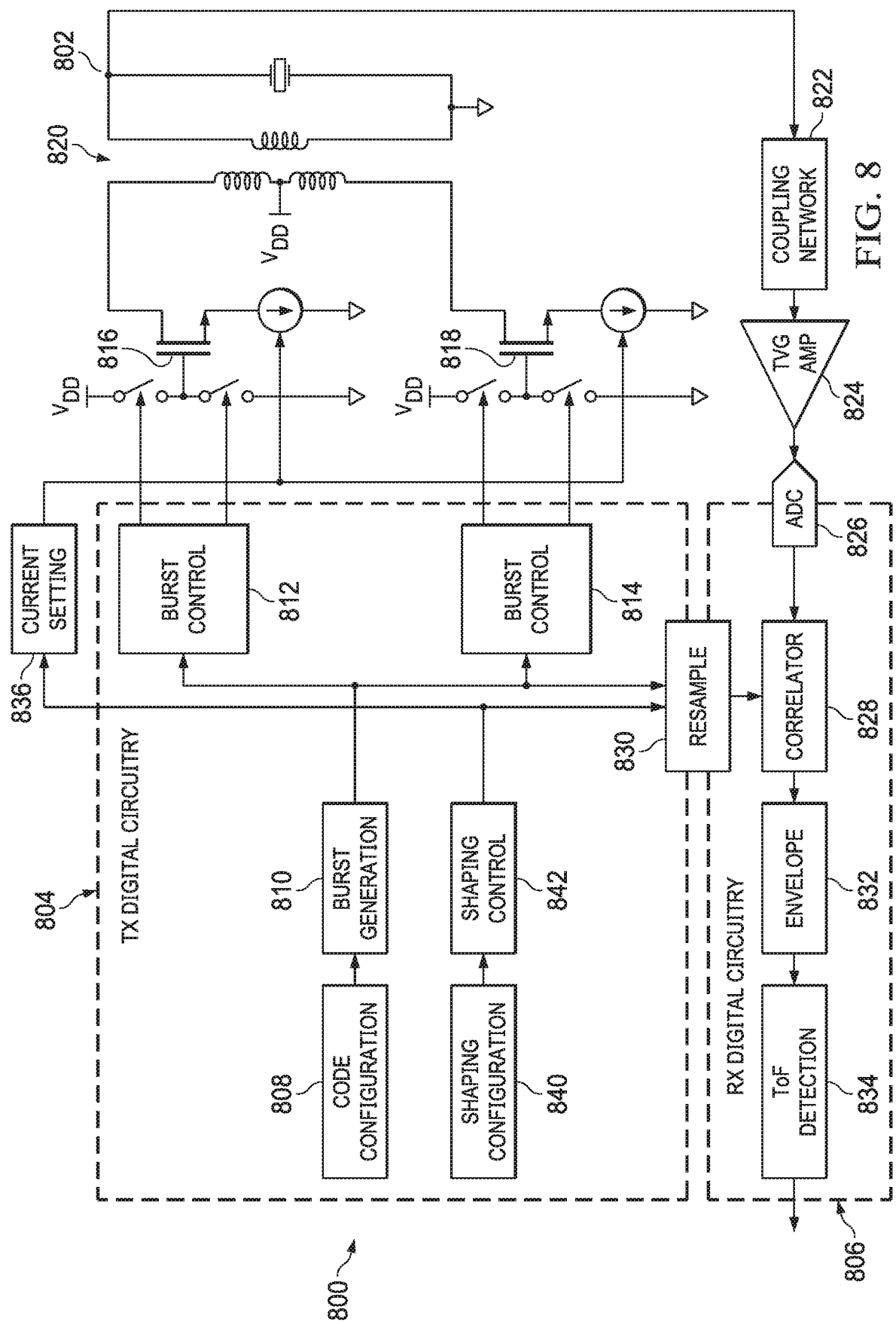
FIG. 8 is a block diagram of an example portion of a controller and an associated transducer.

In contrast to the arrangement illustrated in FIG. 5, FIG. 8 schematically illustrates another example portion 800 of a controller and its associated transducer 802, wherein the current setting circuitry 836 on the transmitter end is controlled by shaping control circuitry 842, which also provides a second input signal to resample circuitry 830 on the receiver end. Except as described below, example 800 functions the same as example 500, and similarly numbered components behave as described above with respect to FIG. 5.

Transmitter digital circuitry 804 includes coding configuration circuitry 808 and burst generation circuitry 810 to generate a frequency-modulation coded burst signal of pulses of different time durations corresponding to different frequencies. As described before, the coded burst signal is sent to burst control circuitry 812, 814 to control switches connected to the gates of FETs 816, 818 and, in turn, drive transformer 820 to induce transducer 802 to emit an acoustic signal corresponding to the coded burst pattern. A subsequently received reflected acoustic signal is converted by transducer 802 into an electrical signal for provision to coupling network 822 and TVG receiver amplifier 824. ADC 826 at the received signal input to receiver digital circuitry 806 samples the received signal for provision to correlator circuitry 828, and on to envelope circuitry 832 and ToF detection circuitry 834 to output the determined time of flight of the emitted, reflected, and sensed acoustic signal.

As with correlator circuitry 528 in example 500, correlator circuitry 828 in example 800 receives a TX template from resample circuitry 830. However, in example 800, the TX template is generated not only based upon the modulation code generated by coding configuration circuitry 808 and burst generation circuitry 810, but also based upon burst signal amplitude shaping information generated by shaping configuration circuitry 840 and shaping control circuitry 842, as reflected in FIG. 8 by resample circuitry 830 having two inputs instead of just the one input to resample circuitry 530 in FIG. 5.

In example 800, then, burst signal shaping can be provided via adjustment of amplitudes of the various pulses in a burst, e.g, to ramp the strength of the burst up, to a maximum strength, and then to ramp the strength of the burst back down again, just as shown in FIGS. 3 and 4. Another shaping profile can involve ramping the strength of the burst up to a maximum strength, and then remaining at the maximum strength until the end of the burst. Other shaping profiles are also possible, in similar fashion to the way coding signatures can vary, as described previously. Transmitter digital circuitry 804 includes shaping configuration circuitry 840 configured to determine the profile of the shaping. In some examples, this determination can be made pursuant to a parameter or parameters programmable by a user, such as a systems integrator. In other examples, this determination can be made pursuant to a signal or signals received from a higher-level controller, such as an ECU (not shown in FIG. 8). Based on the provided configuration, shaping control circuitry 842 generates a shaping signal indicative of the shaping to current setting circuitry 836 and resample circuitry 830.

Accordingly, the current signal provided by current setting circuitry 836 to set the current level provided to FETs 816, 818 via their respective source-node-connected current sources, each of which controls the corresponding FET's current output, is not constant-value, but rather, varies in time in accordance with the burst amplitude shape described by the output of shaping control circuitry 842 (e.g., as a ramp-up-and-down, or otherwise). The controlled amplitude of the produced burst signal thus follows the amplitude shape specified by shaping configuration circuitry 840, and, as such, every pulse in the burst may have its own distinct strength, rather than all pulses having the same strength, as in the example 500 of FIG. 5. The burst shape described by the output of shaping control circuitry 842 is provided also to resample circuitry 830 for incorporation into the TX template provided to correlator circuitry 828, and thus informs the correlation processing performed on the receiver side.

Figure 9:
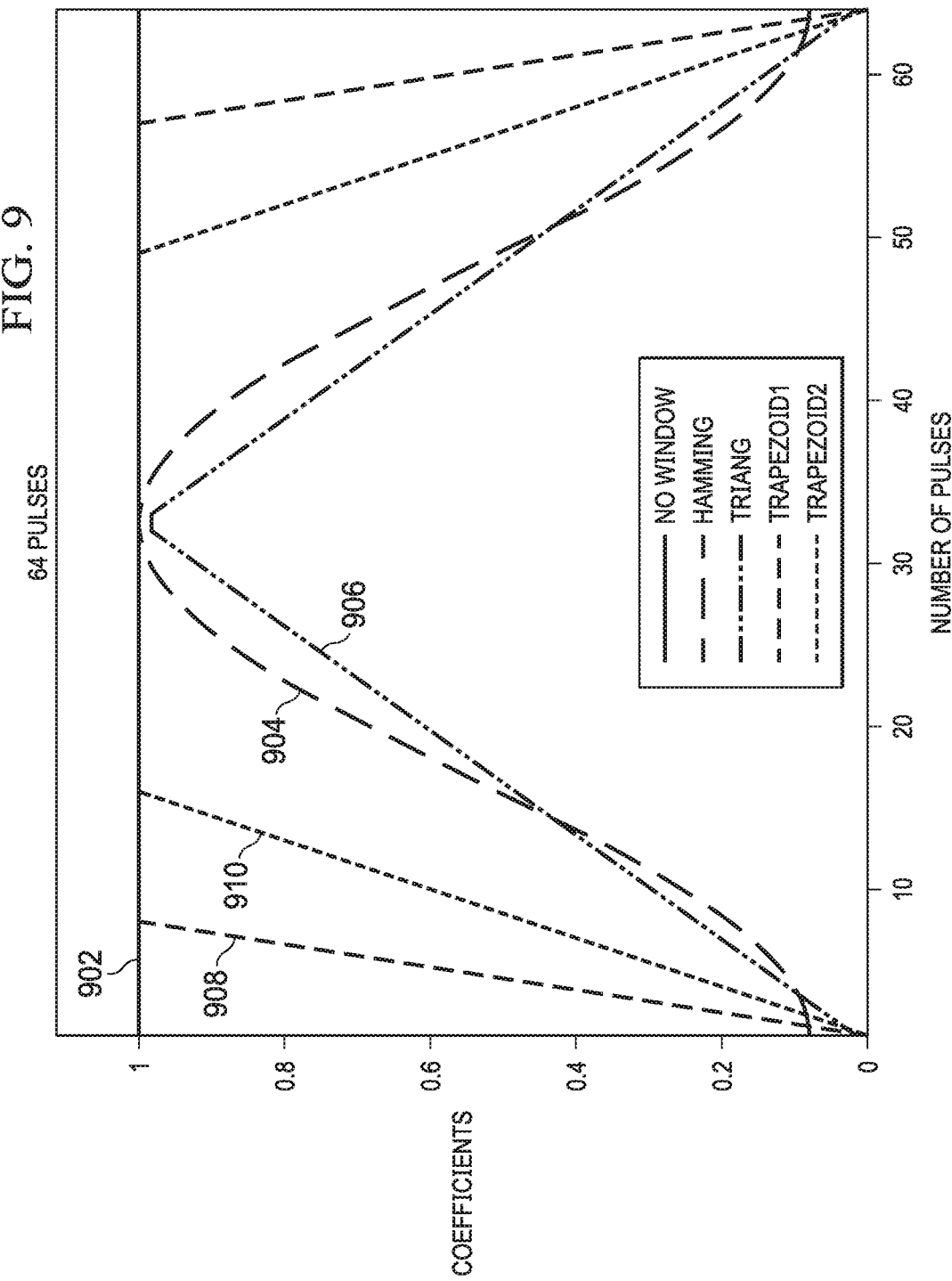
FIG. 9 is a graph of several example burst shaping windows.

The burst shape can, for example, correspond to one of a variety of different windows, as illustrated with respect to each other in FIG. 9. In the example of FIG. 9, each burst consists of sixty-four pulses, but the five illustrated shaping window functions can be adapted accordingly for bursts of lesser or greater pulse-number length. As illustrated by plot 902, the constant-value case of example 500 can be provided in example 800 by applying no window at all to supply a constant switching current such that every pulse in a burst uses the same current setting. Plot 904 shows a Hamming window function, a taper formed by using a raised cosine with non-zero endpoints. Plot 906 shows a triangular window function, the linear ramp-up which continues until or almost until the pulse-number midpoint, and the linear ramp-down which begins right after or nearly right after the pulse-number midpoint. Plot 908 shows a comparatively wider trapezoidal window, having a faster linear ramp-up and linear ramp down and a longer middle constant-value duration (of about fifty-two pulses) than plot 910, which shows a comparatively narrower trapezoidal window having a comparatively slower linear ramp-up and linear ramp-down and thus a comparatively shorter middle constant-value duration (of about thirty-four pulses).

Figure 10:
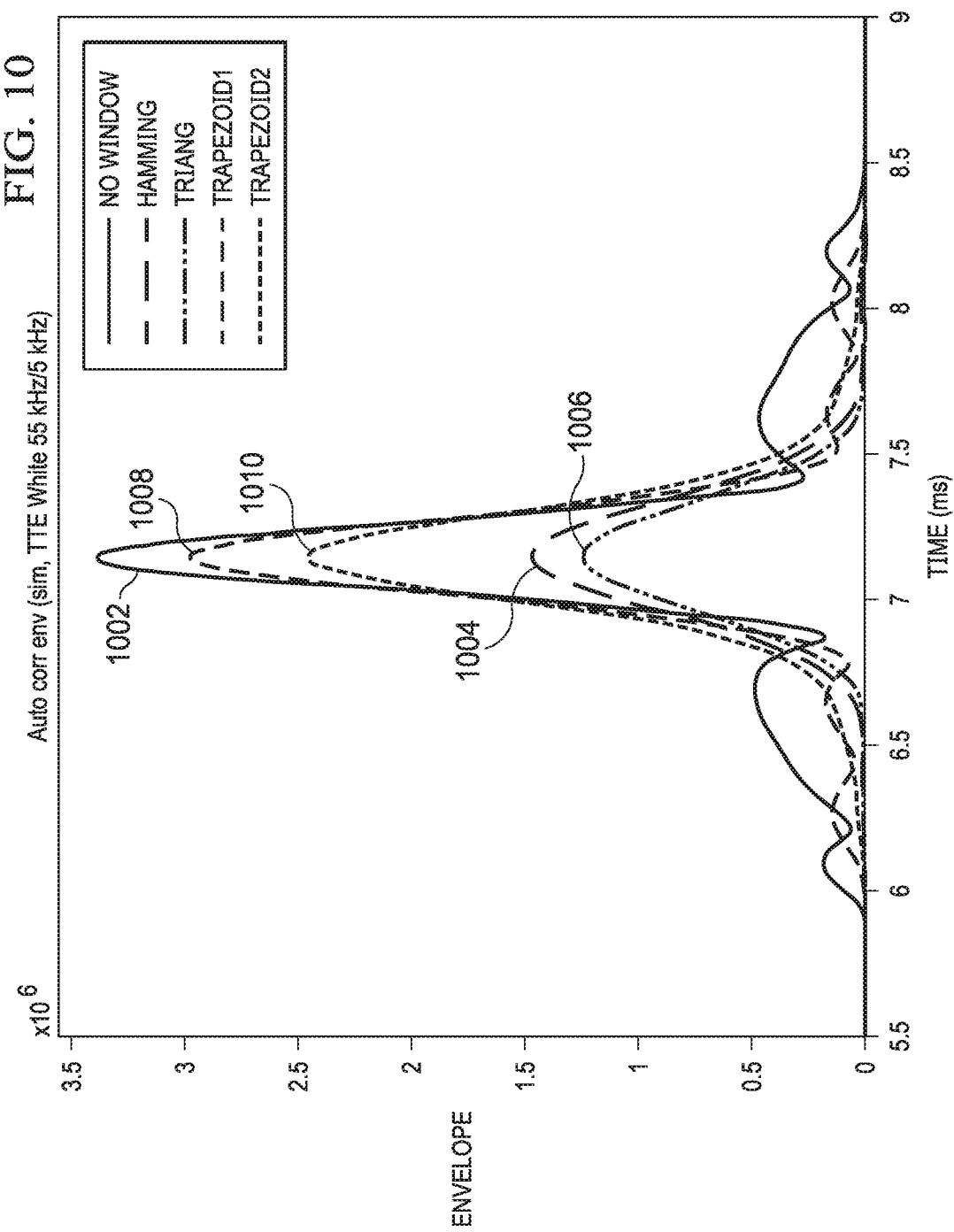
FIG. 10 is a graph of several example autocorrelated envelopes corresponding to the burst shaping windows of FIG. 9.

The side-lobe reduction effect obtained by the burst shapings created by the various window functions of FIG. 9 is illustrated in FIG. 10, which shows five example outputs of the envelope circuitry 832 following correlation by correlator circuitry 828. The envelope with the tallest peak 1002 is the same as the one illustrated in FIG. 7, as both are produced by constant-value amplitude shaping 902 (i.e., no shaping control at all). The Hamming window 904 and triangular window 906 result in the envelopes having peaks 1004 and 1006, respectively, showing excellent side-lobe reduction but also substantial diminishment of the main peak. Use of the wider trapezoidal window 908 characterized by rapid ramp-up and ramp-down shows substantially less main peak reduction but can also leave substantial side lobes, as shown in the envelope peaking at 1008. Peak 1010 marks the result of using the narrower trapezoidal window 910, which exhibits near-total side-lobe elimination without as much sacrifice of main peak amplitude as with the Hamming and triangular windows 904, 906. Thus, the shaping control effected by example 800 can employ different kinds of current-control windows, as in FIG. 9, and each window produces different side-lobe values and different main peak values, as seen in FIG. 10.

Figure 11:
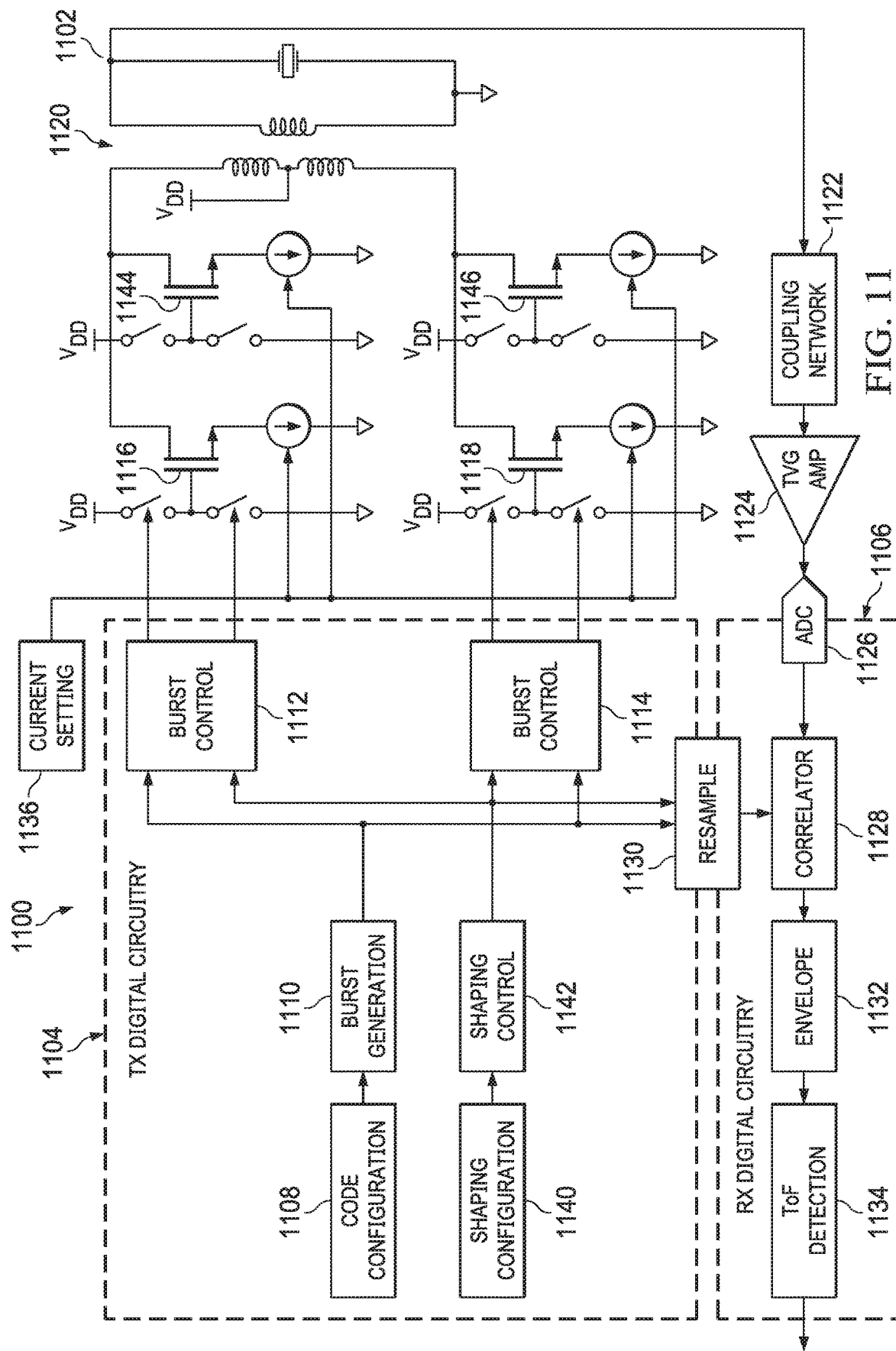
FIG. 11 is a block diagram of an example portion of a controller and an associated transducer.

Whereas example 800 of FIG. 8 controls the shape of the burst waveform emitted by transducer 802 by controlling the current setting 836 based on the number of pulses, example 1100 of FIG. 11 retains the same current setting for all pulses, just as in example 500 of FIG. 5, but nevertheless is capable of providing burst shaping equivalent to that provided by example 800 by multiplying the number of switched current branches to the transformer 1120 and using a greater number of switches (e.g., CMOS switches) to control current to the multiple branches. Each switch can only carry a fixed amount of current when turned on as set by the output of current setting 1136, thus, more current is provided to transformer 1120 if multiple switches are turned on simultaneously. The relative strength of pulses in a burst driving signal can be controlled based on the number of switches switched, thereby providing the same shaping control on the burst driving signal as would be provided by having a windowed current setting as in example 800 of FIG. 8. The multiple arrows coming out of burst control circuitry 1112, 1114 indicate that the switches associated with each FET 1116, 1144, 1118, 1146 are controlled separately. The remaining components in example 1100 of FIG. 11 function the same as their similarly-numbered counterparts shown in example 800 of FIG. 8 and as described above with respect to FIGS. 5 and 8.

Example portion 1100 of a controller and its associated transducer 1102 thus can achieve side lobe suppression through the shaping of the TX bursting waveform and the RX correlator template to achieve a shaped coding waveform. In particular, the example 1100 of FIG. 11 can achieve TX burst shaping through number of transformer current branches turned on and RX template shaping by modifying the coding template delivered to correlator circuitry 1128. Transmitter digital circuitry 1104 includes coding configuration circuitry 1108 and burst generation circuitry 1110 to generate a frequency-modulation coded burst signal of pulses of different time durations corresponding to different frequencies. The coded burst signal is sent to burst control circuitry 1112, 1114 to control switches connected to the gates of FETs 1116, 1144, 1118, 1146 and, in turn, drive transformer 1120 to induce transducer 1102 to emit an acoustic signal corresponding to the coded burst pattern. A subsequently received acoustic signal is converted by transducer 1102 into an electrical signal for provision to coupling network 1122 and TVG receiver amplifier 1124. ADC 1126 at the received signal input to receiver digital circuitry 1106 samples the received signal for provision to correlator circuitry 1128, and on to envelope circuitry 1132 and ToF detection circuitry 1134 to output the determined time of flight of the emitted, reflected, and sensed acoustic signal.

Correlator circuitry 1128 in example 1100 receives a TX template from resample circuitry 1130. In example 1100, as in example 800, the TX template is generated not only based upon the modulation code generated by coding configuration circuitry 1108 and burst generation circuitry 1110, but also based upon signal amplitude shaping information generated by shaping configuration circuitry 1140 and shaping control circuitry 1142, as reflected in FIG. 11 by resample circuitry 1130 having two inputs instead of just the one input to resample circuitry 530 in FIG. 5.

As in example 800 of FIG. 8, in example 1100, burst signal amplitude shaping can be provided via adjustment of amplitudes of the various pulses in a burst, e.g, to ramp the strength of the burst up to a maximum strength, and then to ramp the strength of the burst back down again. Other shaping profiles are also possible, as discussed above. Transmitter digital circuitry 1104 includes shaping configuration circuitry 1140 configured to determine the profile of the shaping. In some examples, this determination can be made pursuant to a parameter or parameters programmable by a user, such as a systems integrator. In other examples, this determination can be made pursuant to a signal or signals received from a higher-level controller, such as an ECU (not shown in FIG. 11). Based on the provided configuration, shaping control circuitry 1142 generates a shaping signal indicative of the shaping to current setting circuitry 1136 and resample circuitry 1130.

Accordingly, the current signal provided by current setting circuitry 1136 can remain a constant-value with respect to time during a burst. Nevertheless, owing to the switching control provided by burst control circuitry 1112 and burst control circuitry 1114 to set the voltages provided to the gates of FETs 1116, 1118, 1144, 1146 (and so on, in examples having more such FETs), the signal provided to transformer 1120 and thereby to transducer 1102 can vary in time in accordance with the burst shape described by the output of shaping control circuitry 1142 (e.g., as a ramp-up-and-down, or otherwise). The controlled amplitude of the produced burst signal follows the shape specified by shaping configuration circuitry 1140, and, as such, every pulse in the burst may have its own distinct strength, rather than all bursts having the same strength, as in the example 500 of FIG. 5. The burst shape described by the output of shaping control circuitry 1142 is provided also to resample circuitry 1130 for incorporation in the TX template provided to correlator circuitry 1128, and thus informs the correlation processing performed therein on the receiver side.

Figure 12:
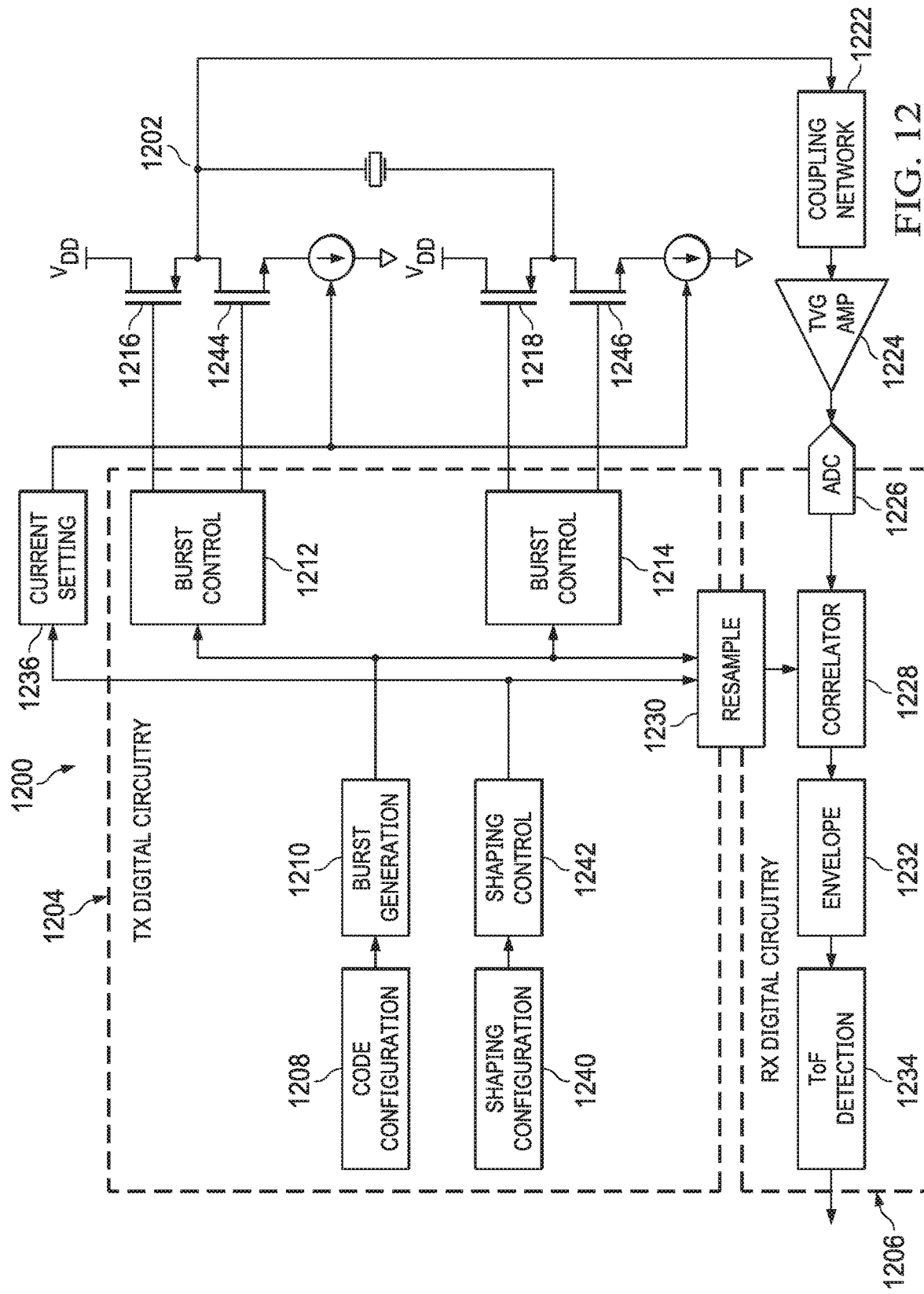
FIG. 12 is a block diagram of an example portion of a controller and an associated transducer, in a full-bridge direct-drive configuration.
Figure 13:
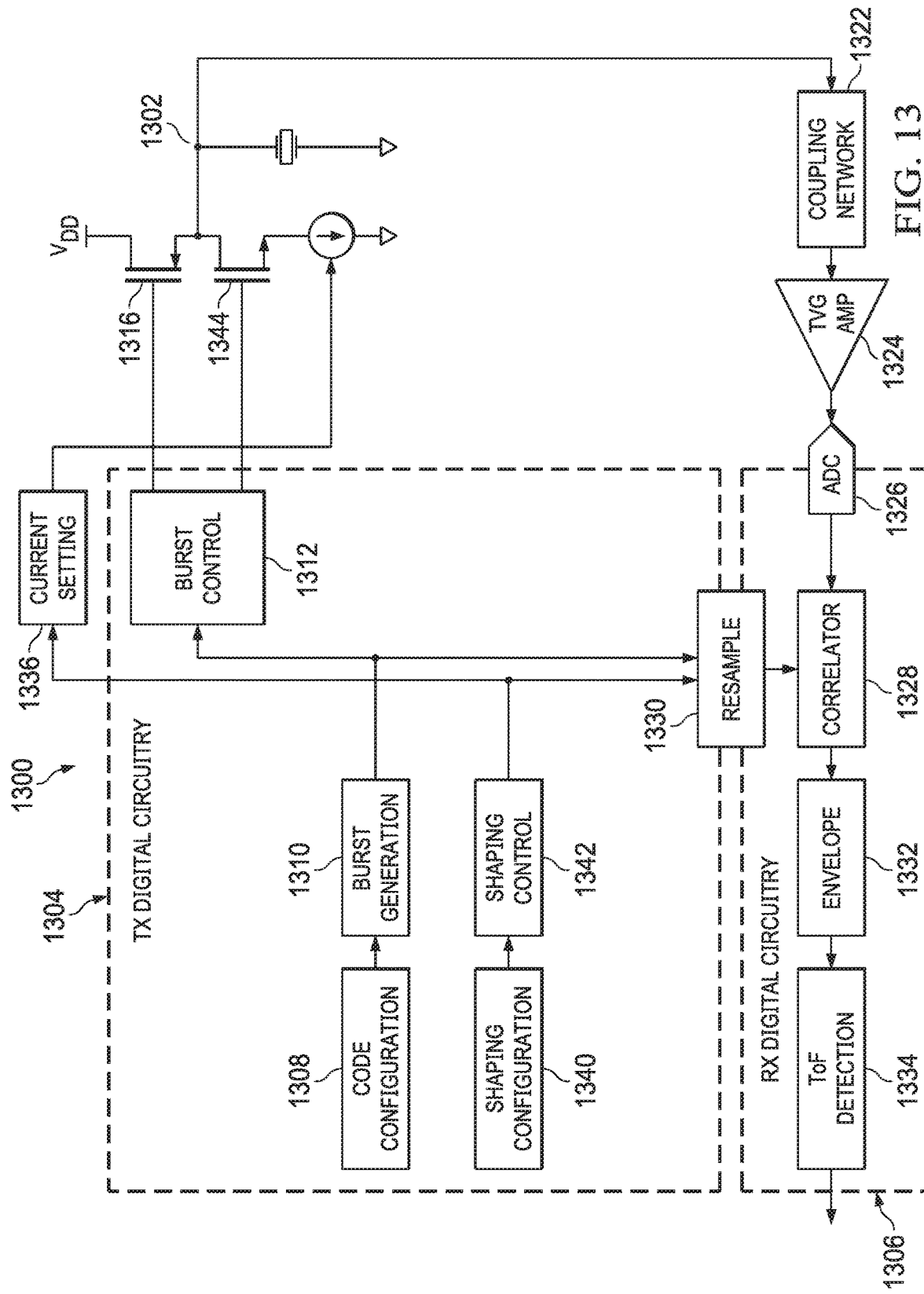
FIG. 13 is a block diagram of an example portion of a controller and an associated transducer, in a half-bridge direct-drive configuration.

FIGS. 12 and 13 illustrate direct-drive implementations of pulse-shaping circuitry systems similar to that already described with respect to FIG. 8, but with direct drive of the burst transducer, rather than inductive drive of the burst transducer. FIG. 12 illustrates a full-bridge configuration 1200. FIG. 13 illustrates a half-bridge configuration 1300. In the full-bridge configuration 1200, all components (transmitter digital circuitry 1204, code configuration circuitry 1208, burst generation circuitry 1210, burst control circuitry 1212, 1214, shaping configuration circuitry 1240, shaping control circuitry 1242, current setting circuitry 1236, resample circuitry 1230, coupling network 1222, TVG receiver amplifier 1224, ADC 1226, correlator circuitry 1228, envelope circuitry 1232, and ToF detection circuitry 1234) function as previously described with respect to similarly numbered components shown in FIG. 8. As described previously, current setting circuitry 1236 adjusts the current sources associated with driving FETs 1216, 1244, 1218, 1246 based on the output of shaping control circuitry 1242, which is also fed into resample circuitry 1230 for input into correlator circuitry 1228 on the receiving end in receiver digital circuitry 1206. However, each pair of driving FETs 1216, 1244 and 1218, 1246 are arranged in series in a manner so as to directly drive transducer 1202, without a transformer like transformer 820 from FIG. 8. Accordingly, the outputs of burst control circuitry 1212 are provided directly to the gates of FETs 1216, 1244 and the outputs of burst control circuitry 1214 are provided directly to the gates of FETs 1218, 1246, rather than to drive switches, as in FIG. 8.

Similarly, in the half-bridge configuration 1300 shown in FIG. 13, all components (transmitter digital circuitry 1304, code configuration circuitry 1308, burst generation circuitry 1310, burst control circuitry 1312, shaping configuration circuitry 1340, shaping control circuitry 1342, current setting circuitry 1336, resample circuitry 1330, coupling network 1322, TVG receiver amplifier 1324, ADC 1326, correlator circuitry 1328, envelope circuitry 1332, and ToF detection circuitry 1334) function as previously described with respect to similarly numbered components shown in FIG. 8. As described previously, current setting circuitry 1336 adjusts the current source associated with driving FETs 1316, 1344 based on the output of shaping control circuitry 1342, which is also fed into resample circuitry 1330 for input into correlator circuitry 1328 on the receiving end in receiver digital circuitry 1306. However, the driving FETs 1316, 1344 are arranged in series in a manner so as to directly drive transducer 1302, without a transformer like transformer 820 from FIG. 8. Accordingly, the outputs of burst control circuitry 1312 are provided directly to the gates of FETs 1316, 1344, rather than to drive switches, as in FIG. 8. As shown in this half-bridge configuration 1300, the other end of the transducer 1302 is connected to ground, rather than to another FET-pair output as in the full-bridge configuration 1200 of FIG. 12.

Figure 14:
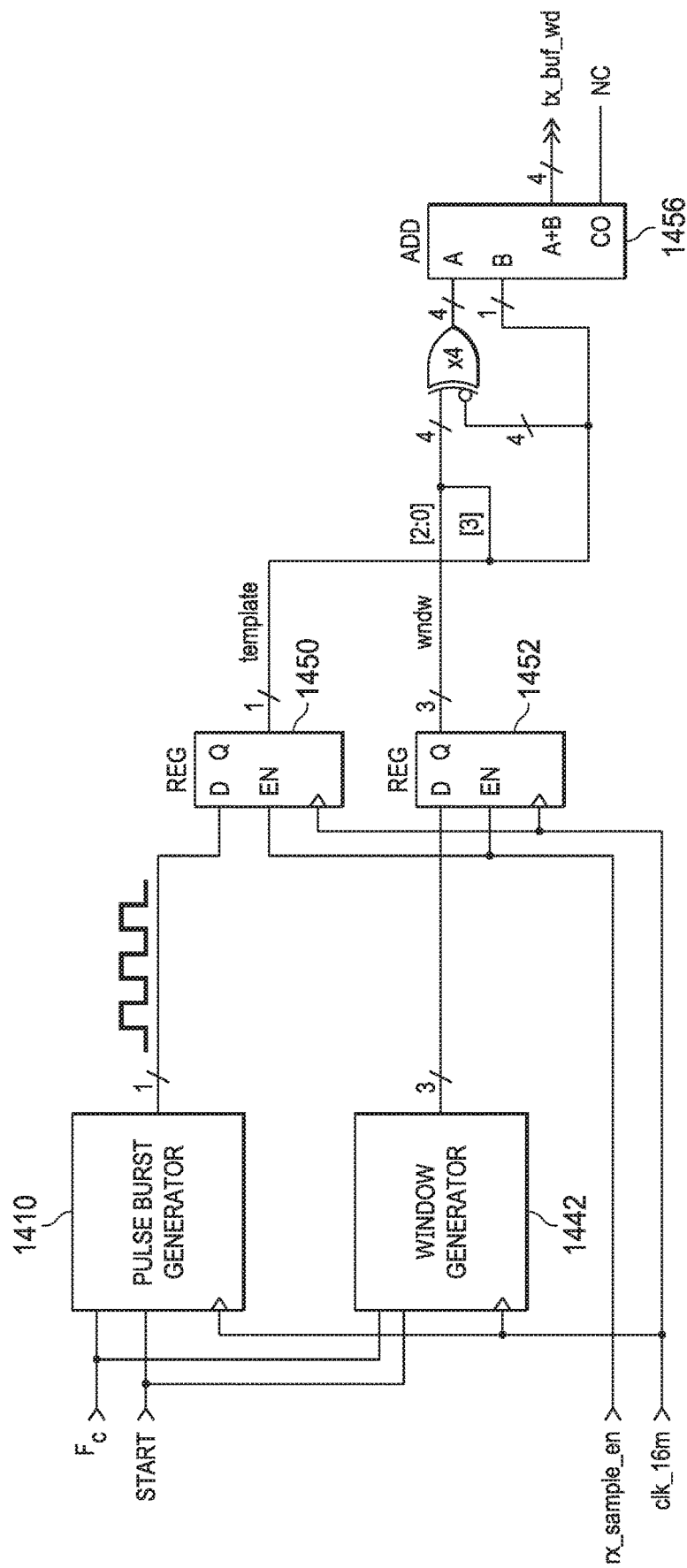
FIG. 14 is a block diagram of an example implementation of resample circuitry used to feed a shaped burst template to correlator circuitry.

FIG. 14 provides a schematic illustration of an example resample circuitry corresponding to resample circuitry 830, 1130, 1230, and 1330 in FIGS. 8, 11, 12, and 13, respectively. Pulse burst generator 1410, which can correspond to code configuration circuitry 808, 1108, 1208, or 1308 and burst generation circuitry 810, 1110, 1210, or 1310, can generate a one-bit switching signal indicative of the frequency-modulated burst pattern (e.g., template pattern 202 in FIG. 2). Window generator 1442, which can correspond to shaping configuration circuitry 840, 1140, 1240, or 1340 and shaping control circuitry 842, 1142, 1242, or 1342, controls the strength of each regular pulse (e.g., window pattern 204 in FIG. 2) and can be conveyed as a full-precision floating point value or a value of lesser bit depth, e.g., quantized to only three bits, as illustrated in FIG. 14. The output of pulse burst generator 1410 and window generator 1442 can be sampled at a high sampling rate, for example, 16 megahertz, determined by the clock signal clk_16M. After these two inputs are latched by respective resample circuitry D flip-flops 1450, 1452 according to an enable signal rx_sample_en, which is at the rate of sampled receive signal, for example 400 kilohertz, to provide signals labeled template and wndw in FIG. 14, they are combined together by a combinational logic circuit (shown in FIG. 14, for example, as XOR gates 1454 and adder 1456) to provide a TX template waveform tx_buf_wd that can be of changing amplitude (e.g., windowed template pattern 302 of FIG. 3). This TX template waveform can then be provided to correlator circuitry 828, 1128, 1228 or 1328, as shown in FIGS. 8, 11, 12, and 13, respectively. As an example, the template and wndw signals can be related to the output tx_buf_wd as provided in the following table.

| template | wndw | template:wndw 4-bit code | tx_buf_wd 4-bit code |
|---|---|---|---|
| 0 | 0 | 0_000 | 1_111 |
| 0 | 1 | 0_001 | 1_110 |
| 0 | 2 | 0_010 | 1_101 |
| 0 | 3 | 0_011 | 1_100 |
| 0 | 4 | 0_100 | 1_011 |
| 0 | 5 | 0_101 | 1_010 |
| 0 | 6 | 0_110 | 1_001 |
| 0 | 7 | 0_111 | 1_000 |
| 1 | 0 | 1_000 | 0_001 |
| 1 | 1 | 1_001 | 0_010 |
| 1 | 2 | 1_010 | 0_011 |
| 1 | 3 | 1_011 | 0_100 |
| 1 | 4 | 1_100 | 0_101 |
| 1 | 5 | 1_101 | 0_110 |
| 1 | 6 | 1_110 | 0_111 |
| 1 | 7 | 1_111 | 0_000 |

Figure 15:
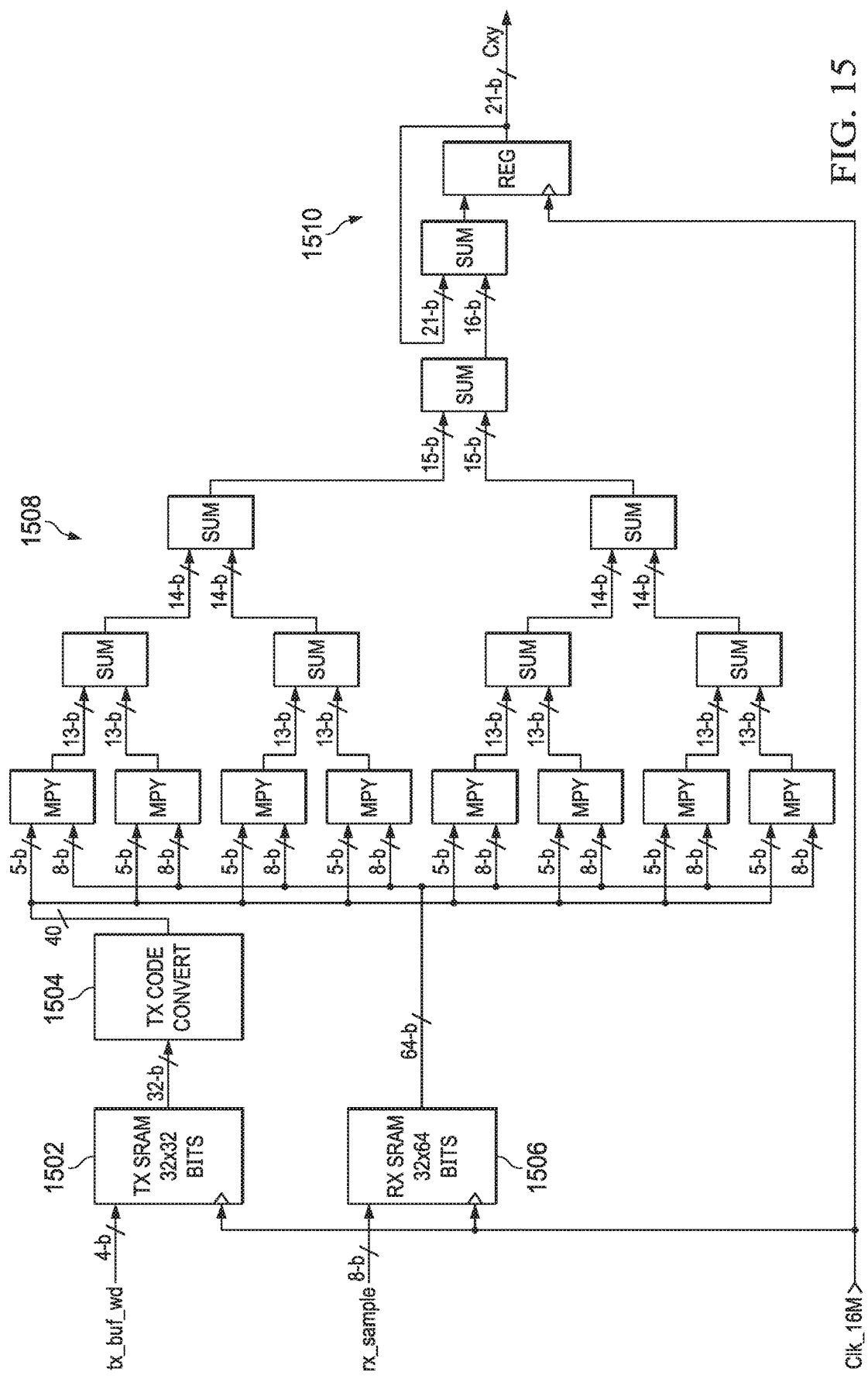
FIG. 15 is a block diagram of an example implementation of correlator circuitry used to correlate a received ultrasonic signal with the shaped burst template.

FIG. 15 provides a schematic illustration of an example pipelined implementation of correlator circuitry 1500 that can correspond to correlator circuitry 828, 1128, 1228, or 1328. A TX template waveform or a signal based thereon, as may be provided by resample circuitry 830, 1130, 1230, or 1330, can be provided on the line labeled tx_buf_wd in FIG. 15. This signal can be, for example, tx_buf_wd from FIG. 14. The TX template waveform or signal based thereon tx_buf_wd can be stored in a memory 1502 (e.g., an SRAM) and converted by TX code convert circuitry 1504, which is explained in greater detail with reference to FIG. 16. The sampled received signal, as may be provided by ADC 826, 1126, 1226, or 1326, can be provided on the eight-bit bus labeled rx_sample in FIG. 15. The sampled received signal can be stored in a memory 1506 (e.g., an SRAM). The correlation can be implemented as eight-sample partial sum network 1508 and a thirty-two partial sums accumulator 1510. RX samples are multiplied with the TX template and they sum together to provide the output Cxy at a particular time instance. Since the sampled received signal rx_sample can come in at a lower rate, e.g., 500 kilohertz, than the clock, e.g., 16 megahertz, multiple operation cycles are available to run the correlation calculation. The correlation operation can be 128-tap long, for example. With an eight-sample multiply and sum, 128/8=16 operation cycles are needed to finish one correlation calculation.

Figure 16:
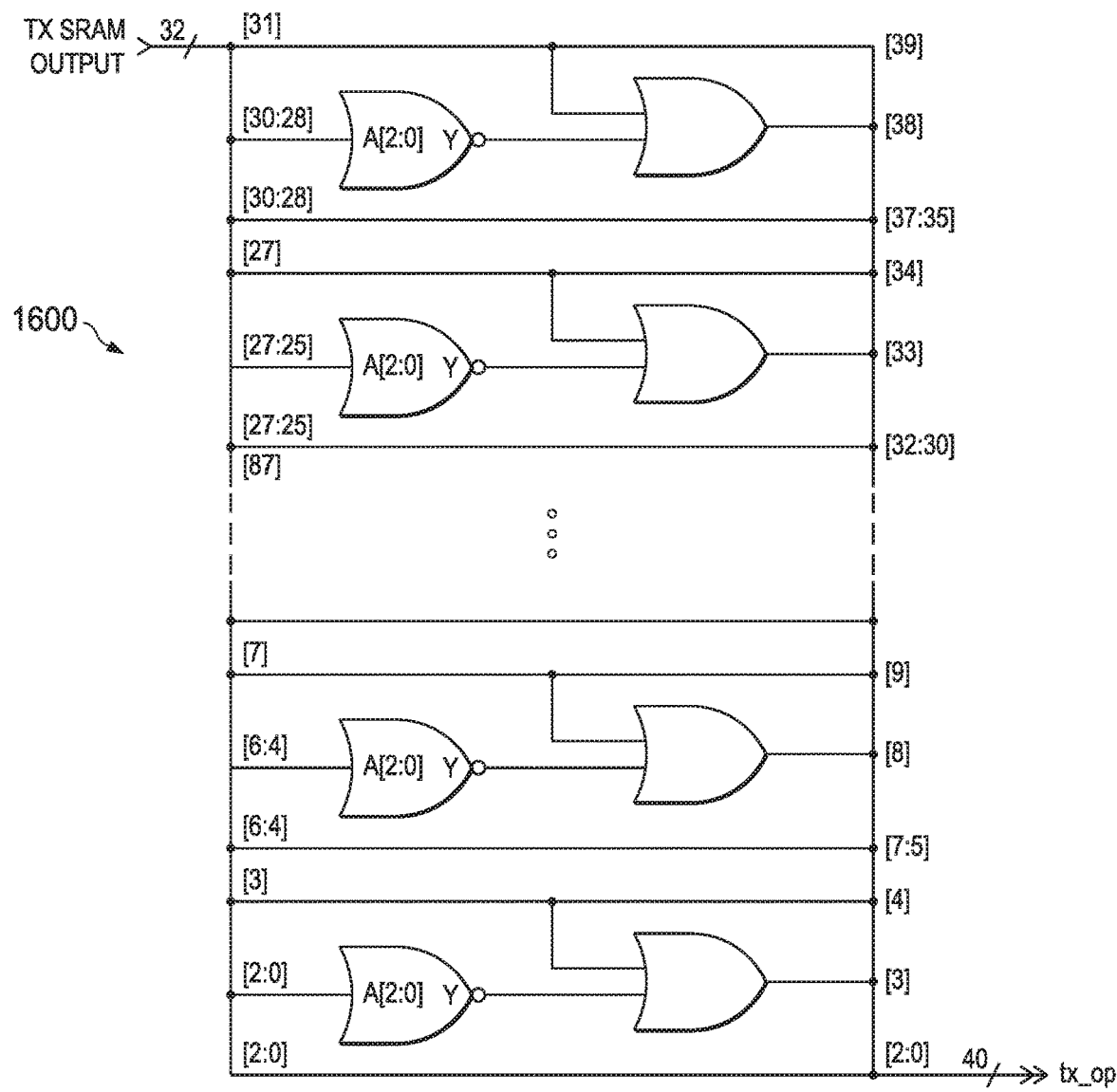
FIG. 16 is a block diagram of an example implementation of a TX code convert circuitry used to convert a signal to standard 2's complement representation.

For example, the tx_buf_wd signal from FIG. 14 may be 4-bit, and can be stored in the memory 1502 for an entire burst. However, the format of this signal may not be standard 2's complement representation. To use it in the correlation calculation, its value can be converted to a standard 2's complement representation having 5 bits for each sample, using TX code convert circuitry 1504. FIG. 16 illustrates an example TX code convert circuitry 1600 that can correspond to TX code convert circuitry 1504 in FIG. 15. As shown in FIG. 16, the input of TX code convert circuitry 1600 is 32 bits (e.g., the 32-bit output of the memory 1502 in FIG. 15) and the output tx_op, produced by feeding the input through a network of logic gates, is 40 bits. This output tx_op can be the signal fed into the partial sum network 1508 in FIG. 15. The following table illustrates the conversion functionality of TX code convert circuitry 1600.

| tx_buf_q 4-bit code | tx_op 5-bit code | tx_op decimal |
|---|---|---|
| 1_111 | 1_1111 | −1 |
| 1_110 | 1_1110 | −2 |
| 1_101 | 1_1101 | −3 |
| 1_100 | 1_1100 | −4 |
| 1_011 | 1_1011 | −5 |
| 1_010 | 1_1010 | −6 |
| 1_001 | 1_1001 | −7 |
| 1_000 | 1_1000 | −8 |
| 0_001 | 0_0001 | 1 |
| 0_010 | 0_0010 | 2 |
| 0_011 | 0_0011 | 3 |
| 0_100 | 0_0100 | 4 |
| 0_101 | 0_0101 | 5 |
| 0_110 | 0_0110 | 6 |
| 0_111 | 0_0111 | 7 |
| 0_000 | 0_1000 | 8 |

Figure 17:
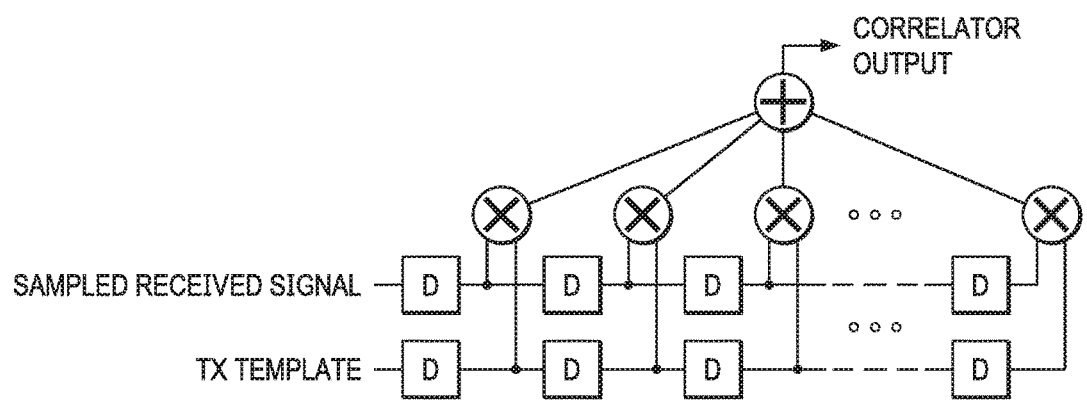
FIG. 17 is a signal flow diagram of example correlator circuitry.

FIG. 17 shows a simplified example signal flow diagram of correlator circuitry that can correspond to, and explains the functioning of, correlator circuitry 1500 illustrated in FIG. 15. The depth of the correlation is equal to the number of samples in the resampled TX template, which is equal to the number of samples in the sampled received signal. Each box labeled "D" represents a one-sample delay unit. The number of delay units in the TX template path is equal to the number of samples in the resampled TX template, which is equal to the number of delay units in the sampled received signal path. Each circle labeled "x" represents a multiplication of samples from the two inputs. The circle labeled "+" represents an addition, i.e. accumulation, of the various multiplied samples. In operation, the TX template stays fixed while the sampled received signal slides for each time index that a new sampled received signal input is received (previously received samples of the sampled received signal are shifted through the chain from left to right). At each time index, RX samples are multiplied with the TX template and they sum together to provide the correlator output at the given time index. For example, the TX template input in FIG. 17 can correspond to the tx_buf_wd input signal in FIG. 15, which can be a 4-bit signal. The sampled received signal in FIG. 17 can be a multi-bit digital signal, for example, 8-bit.

Figure 18:
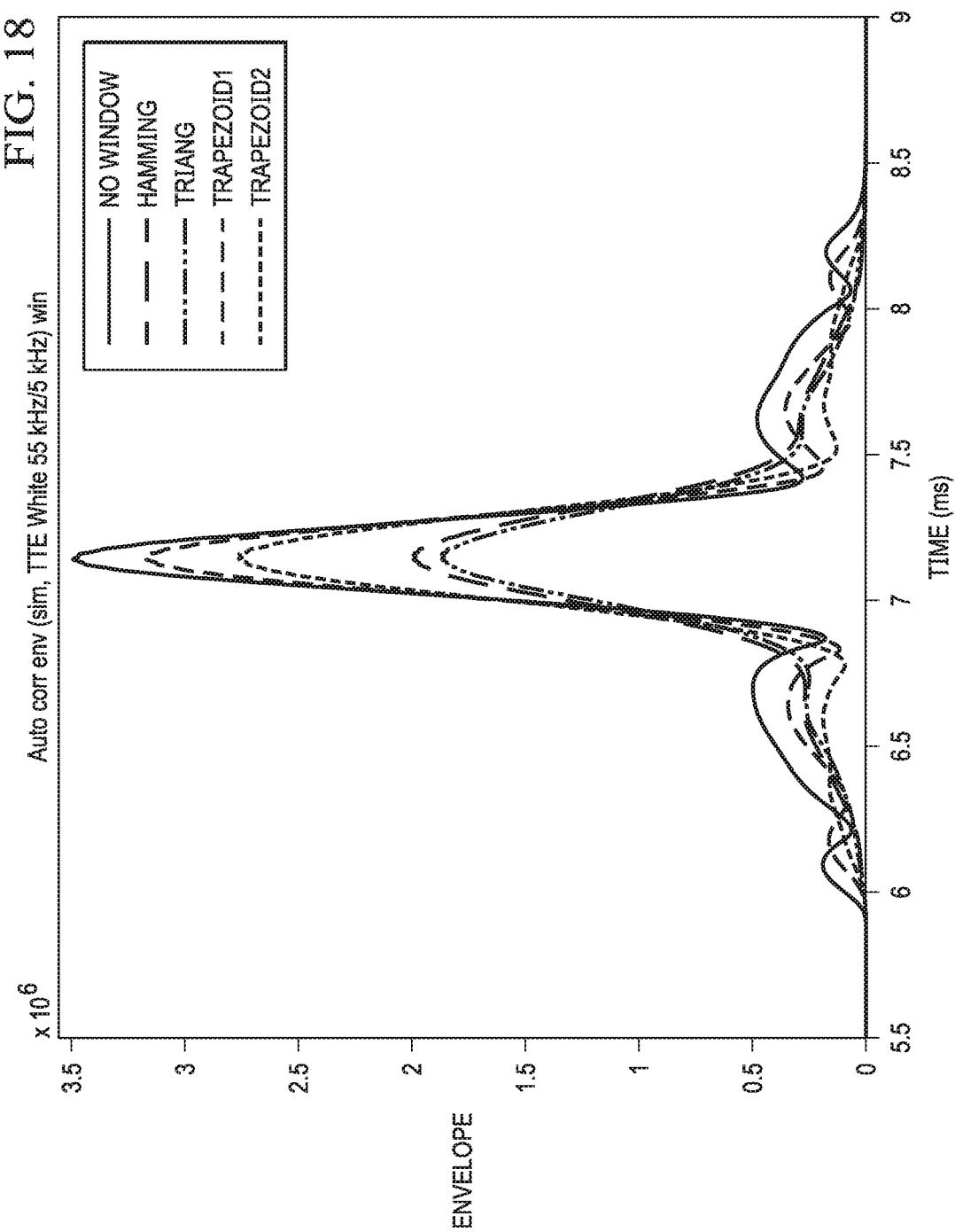
FIG. 18 is a graph of several example autocorrelated envelopes corresponding to the burst shaping windows of FIG. 9, demonstrating the relative effectiveness of shaping at the receive side and not the transmit side.

As illustrated in FIG. 18, systems like those of FIGS. 8, 11, 12, and 13 demonstrate partial effectiveness even when modified so as not to provide TX pulse shaping, but instead to provide the shaping on the RX side alone. Such modified systems have a constant-amplitude driving signal on the TX side but still provide a shaped template for the correlator on the RX side. The result of such modified systems is some side-lobe reduction of lesser effectiveness than if both TX and RX shaping is provided (as in FIGS. 8, 11, 12, and 13). FIG. 18 shows resultant envelopes from an RX-shaping-only modified system and can therefore be compared with the corresponding plots of FIG. 10.

Figure 19:
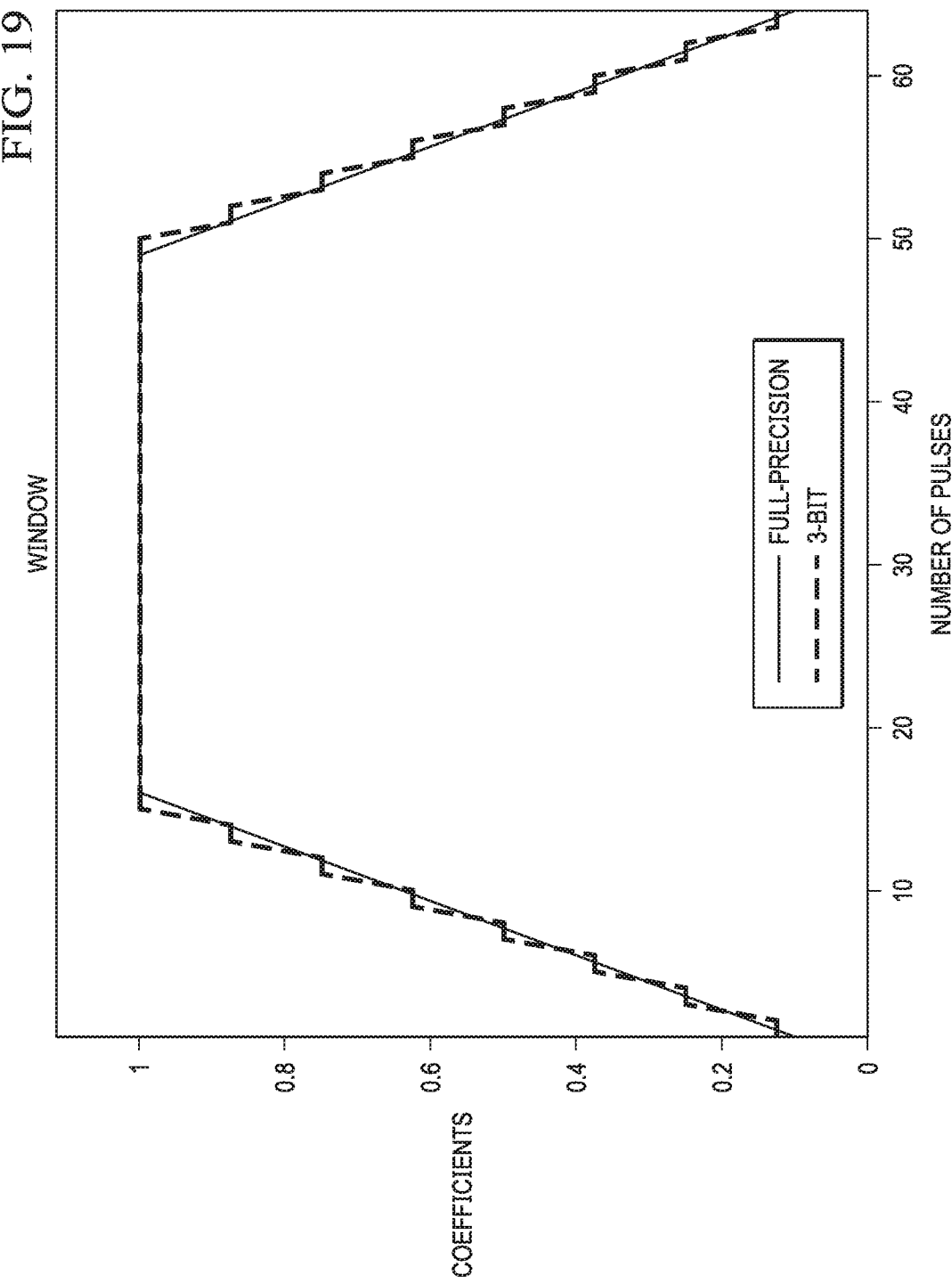
FIG. 19 is a graph of two example trapezoidal burst shaping windows, one quantized at full precision and one using only three-bit quantization.

FIGS. 19 and 20 illustrate the impact of low quantization of the shaping window, i.e., to three-bit quantization instead of full-precision floating point representation. The effective shapes of these two windows are compared in FIG. 19, and the corresponding output envelopes are compared in FIG. 20. As can be noted from FIG. 20, the two different output envelopes align nearly perfectly and resultantly are virtually indistinguishable from each other in FIG. 20. Accordingly, it can be noted that no significant loss in terms of performance is suffered by reducing the quantization of the shaping window amplitude to only three-bit representation.

Figure 21:
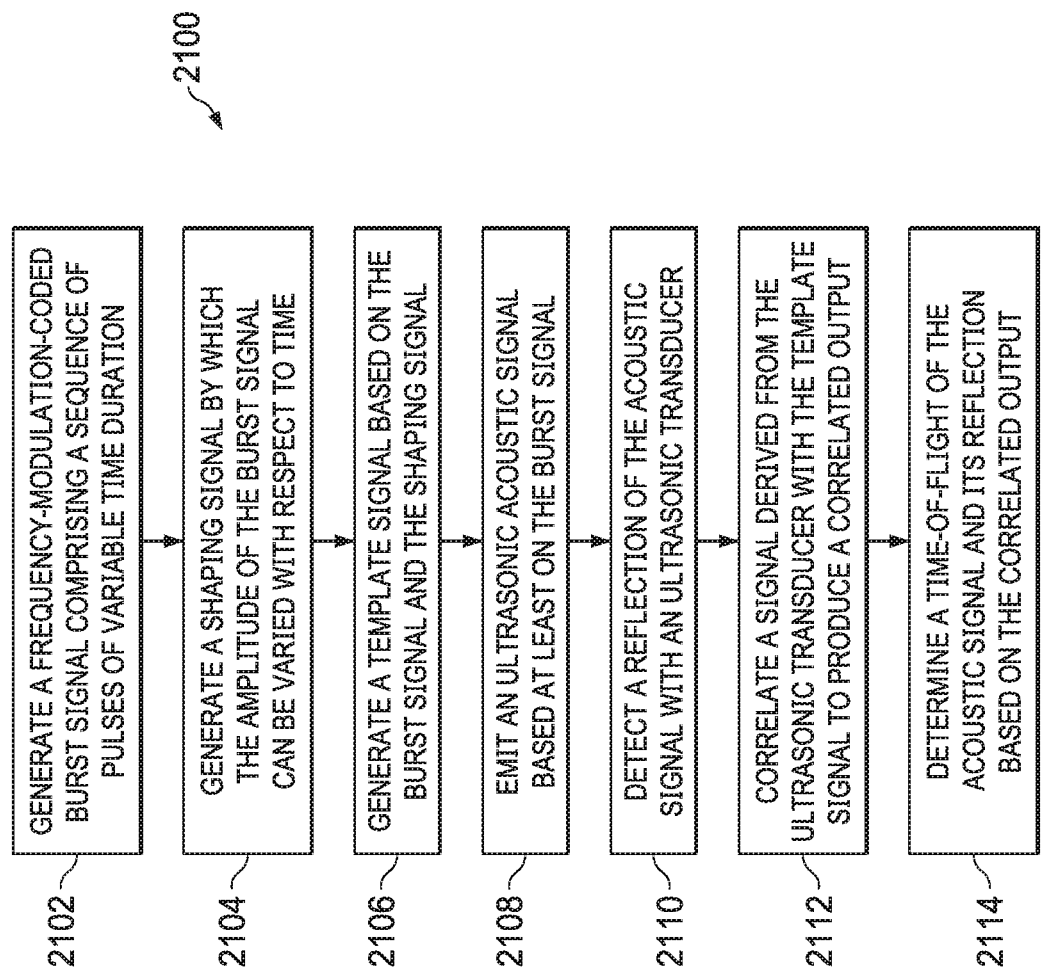
FIG. 21 is a flow chart illustrating an example method of ultrasonic burst shaping.

FIG. 21 illustrates a method 2100 of ultrasonic obstacle detection using burst shaping to reduce side lobes in the envelope of a correlated signal. A frequency-modulation-coded burst signal is generated 2102. The burst signal can be made up of a sequence of pulses of variable time duration, i.e., each pulse can have a different time duration than the next pulse in the burst. Each time duration can correspond to a frequency. Such burst signal generation can be performed, for example, by burst generation circuitry 810, 1110, 1210 or 1310, as described above with reference to FIG. 8, 11, 12, or 13.

A shaping signal, by which the amplitude of the burst signal can be varied with respect to time, is also generated 2104; this can happen before, after, or concurrent with the generation 2102 of the burst signal. Such shaping signal generation can be performed, for example, by shaping control circuitry 842, 1142, 1242, or 1342, as described above with reference to FIG. 8, 11, 12, or 13. The amplitude of the shaping signal can, for example, be quantized to only three bits, i.e., so that it only has eight distinct amplitude values.

Then, a template signal is generated 2106 based on the previously-generated burst signal and shaping signal. Such template signal generation can be performed, for example, by resample circuitry 830, 1130, 1230 or 1330, as described above with reference to FIG. 8, 11, 12, or 13, which can correspond to circuitry further detailed in FIG. 14.

An ultrasonic acoustic signal based at least on the burst signal is emitted 2108, e.g., by an ultrasonic transducer. Such a transducer can be like transducer 105 in FIG. 1 or transducer 802, 1102, 1202, or 1302 in FIG. 8, 11, 12, or 13. A reflection of the acoustic signal is detected 2110 with an ultrasonic transducer, which can be the same transducer used to emit the signal, or a different transducer. In some examples, the emitted acoustic signal is further based on the shaping signal.

A signal derived from the (signal-receiving) ultrasonic transducer is correlated 2112 with the template signal to produce a correlated output. Such correlation can be performed, for example, by correlator circuitry 828, 1128, 1228, or 1328, as described above with reference to FIG. 8, 11, 12, or 13, which can correspond to circuitry further detailed in FIGS. 15, 16, and 17. A time-of-flight of the acoustic signal and its reflection can then be determined 2114 based on the correlated output. Such a determination can be made, for example, by locating the time value of a main peak of an envelope of the correlated output. The determined time-of-flight can be multiplied by the speed of sound and divided by two to provide a distance to a detected obstacle.

The systems and methods described herein can use ultrasonic windowed transmission in the transmitter to improve quality of correlation in the receiver and thereby better distinguish received ultrasonic bursts when multiple ultrasonic transducers burst simultaneously or otherwise in a time-overlapping fashion. The systems and methods described herein advantageously provide reduction of side lobes of correlator outputs while minimizing reduction of correlation peaks by provided an amplitude-shaped TX transmission and a correspondingly shaped RX template used in correlation.

The term "based on" means based at least in part on. In this description, the term "couple" or "couples" means either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. An ultrasonic sensing system comprising:
   burst generation circuitry having a burst generation output, the burst generation circuitry configured to generate a frequency-modulation-coded or phase-modulated-coded burst signal comprising a sequence of pulses of variable time duration;
   shaping control circuitry having a shaping control output, the shaping control circuitry configured to generate a shaping signal by which the amplitude of the burst signal can be varied with respect to time;
   resample circuitry having a resample input coupled to the shaping control output, and having a resample output, the resample circuitry configured to generate a template signal based on the burst signal and the shaping signal; and
   correlator circuitry having a template input coupled to the resample output, and having a correlator output, the correlator circuitry configured to correlate a signal derived from an ultrasonic transducer with the template signal to produce a correlated output.

2. The ultrasonic sensing system of claim 1, further comprising current setting circuitry having a current setting input coupled to the shaping control output, and having a current setting output, the current setting circuitry configured to receive the shaping signal and to adjust, based on the shaping signal, the amplitude of a current provided to control a voltage across an ultrasonic transducer.

3. The ultrasonic sensing system of claim 2, further comprising switches coupled to gates of two field effect transistors (FETs), and wherein respective drains of the FETs are coupled to opposite ends of the primary winding of a transformer configured to step-up voltage to the transducer.

4. The ultrasonic sensing system of claim 3, further comprising burst control circuitry having a burst control input coupled to the burst generation output, and having burst control outputs, the burst control circuitry configured to receive the burst signal and to control the opening and closing of the switches based on the burst signal.

5. The ultrasonic sensing system of claim 1, further comprising burst control circuitry having a burst control inputs respectively coupled to the burst generation output and the shaping control output, and having burst control outputs, the burst control circuitry configured to receive the burst signal and the shaping signal, and to control switches coupled to gates of four or more field effect transistors (FETs), and wherein drains of the FETs are coupled to opposite ends of the primary winding of a transformer configured to step-up voltage to the transducer.

6. The ultrasonic sensing system of claim 5, further comprising current setting circuitry having a current setting output, the current setting circuitry configured to control current sources to each provide a constant current out of the sources of the FETs.

7. The ultrasonic sensing system of claim 1, wherein the shaping control circuitry is configured to provide one of a Hamming window function, a triangular window function, or a trapezoidal window function.

8. The ultrasonic sensing system of claim 1, wherein the shaping control circuitry is configured to provides a shaping function having an amplitude quantized to only three bits.

9. The ultrasonic sensing system of claim 1, wherein the resample circuitry comprises:
- a first D flip-flop configured to resample the burst signal according to a resampling clock signal;
- other D flip-flops configured to resample the shaping signal according to the resampling clock signal; and
- a combinational logic circuit configured to combine the resampled burst and shaping signals and to output the combined signals as the template signal.

10. The ultrasonic sensing system of claim 1, wherein the correlator circuitry comprises an eight-sample partial sum network and a thirty-two partial sums accumulator, wherein samples of the signal derived from the ultrasonic transducer are multiplied with the template signal and the products thereof are summed together to provide the correlated output.

11. A method of ultrasonic detection comprising:
- generating a frequency-modulation-coded or phase-modulation-coded burst signal comprising a sequence of pulses of variable time duration;
- generating a shaping signal by which the amplitude of the burst signal can be varied with respect to time;
- generating a template signal based on the burst signal and the shaping signal, at least in part by resampling the burst signal;
- emitting an ultrasonic acoustic signal based at least on the burst signal;
- detecting a reflection of the acoustic signal with an ultrasonic transducer;
- correlating a signal derived from the ultrasonic transducer with the template signal to produce a correlated output; and
- determining a time-of-flight of the acoustic signal and its reflection based on the correlated output.

12. The method of claim 11, wherein the emitting the ultrasonic acoustic signal comprises adjusting, based on the shaping signal, the amplitude of a current provided to control a voltage across the ultrasonic transducer.

13. The method of claim 12, further comprising controlling, based on the burst signal, switches through which the current is provided to control the voltage.

14. The method of claim 13, wherein exactly four switches are controlled based on the burst signal.

15. The method of claim 11, wherein the emitting the ultrasonic acoustic signal comprises controlling switches based on the shaping signal to vary a voltage across the ultrasonic transducer.

16. The method of claim 15, wherein eight or more switches are controlled based on the shaping signal.

17. The method of claim 11, wherein amplitude changes of the shaping signal are all aligned with either a full period or a half period of the burst signal.

18. Ultrasonic sensing circuitry comprising:
- a memory configured to store a signal received and sampled from the output of an ultrasonic transducer, the received signal containing an echo of a burst signal emitted by the transducer, the burst signal being based on a frequency modulation or phase modulation coding signal and an amplitude shaping signal; and
- correlator circuitry configured to multiply samples of the received signal with a template signal to generate products and to sum the products to provide a correlated signal that correlates the received signal with the template signal, wherein the template signal is based on the frequency modulation or phase modulation coding signal and the amplitude shaping signal.

19. The circuitry of claim 18, wherein the correlator circuitry comprises an eight-sample partial sum network and a thirty-two partial sums accumulator.

20. The circuitry of claim 18, further comprising resample circuitry configured to provide the template signal as a specified number of samples.

21. The circuitry of claim 20, wherein the resample circuitry is configured to receive both the frequency modulation or phase modulation coding signal and the amplitude shaping signal.

* * * * *